(12) United States Patent
Tanaka et al.

(10) Patent No.: US 8,085,323 B2
(45) Date of Patent: Dec. 27, 2011

(54) IMAGE PROCESSING APPARATUS, IMAGE PROCESSING METHOD AND IMAGE PICKUP APPARATUS

(75) Inventors: Seiji Tanaka, Miyagi (JP); Kenkichi Hayashi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 352 days.

(21) Appl. No.: 12/174,474

(22) Filed: Jul. 16, 2008

(65) Prior Publication Data
US 2009/0021601 A1 Jan. 22, 2009

(30) Foreign Application Priority Data

Jul. 17, 2007 (JP) ................................. 2007-185872

(51) Int. Cl.
*H04N 5/202* (2006.01)
(52) U.S. Cl. ........................................ 348/254; 382/274
(58) Field of Classification Search ........................ None
See application file for complete search history.

(56) References Cited

U.S. PATENT DOCUMENTS

| | | | | |
|---|---|---|---|---|
| 5,296,920 A * | 3/1994 | Sakaue et al. | ................. | 348/675 |
| 5,446,504 A * | 8/1995 | Wada | ............................ | 348/645 |
| 5,517,333 A * | 5/1996 | Tamura et al. | ................ | 358/518 |
| 5,619,280 A * | 4/1997 | Yamashita et al. | ............ | 348/645 |
| 5,661,575 A * | 8/1997 | Yamashita et al. | ............ | 358/519 |
| 5,691,779 A * | 11/1997 | Yamashita et al. | ............ | 348/645 |
| 6,101,271 A * | 8/2000 | Yamashita et al. | ............ | 382/167 |
| 6,762,793 B1* | 7/2004 | Fukushima et al. | .......... | 348/254 |
| 7,256,826 B2* | 8/2007 | Sasaki | ............................ | 348/251 |
| 2001/0048476 A1* | 12/2001 | Nakamura et al. | ............ | 348/252 |
| 2004/0201731 A1* | 10/2004 | Kakinuma et al. | ........ | 348/229.1 |
| 2005/0185099 A1* | 8/2005 | Ohsawa et al. | ................ | 348/675 |
| 2006/0115152 A1* | 6/2006 | Tsuchiya | ........................ | 382/169 |
| 2007/0046793 A1* | 3/2007 | Sudo | ............................ | 348/256 |
| 2007/0080975 A1* | 4/2007 | Yamashita et al. | ............ | 345/591 |
| 2007/0182830 A1* | 8/2007 | Katagiri et al. | ............ | 348/222.1 |

FOREIGN PATENT DOCUMENTS

JP 08256344 A * 10/1996
JP 2748678 B2 2/1998

\* cited by examiner

*Primary Examiner* — Lin Ye
*Assistant Examiner* — Dennis Hogue
(74) *Attorney, Agent, or Firm* — Birch, Stewart, Kolasch & Birch, LLP

(57) ABSTRACT

There are provided an image processing apparatus and method capable of providing a good image whose overexposure and underexposure are suppressed by holding information about saturation and contrast at the time of performing a dynamic range compression. In the image processing apparatus, a level information calculating circuit calculates the level information of each pixel from R, G and B image signals for each pixel, a gain calculating circuit refers to a gain table based on the level information of each pixel calculated by the level information calculating circuit and calculates a gain by which the R, G and B signals of each pixel are multiplied, and a multiplying circuits multiply the R, G and B signals by the gain.

9 Claims, 25 Drawing Sheets

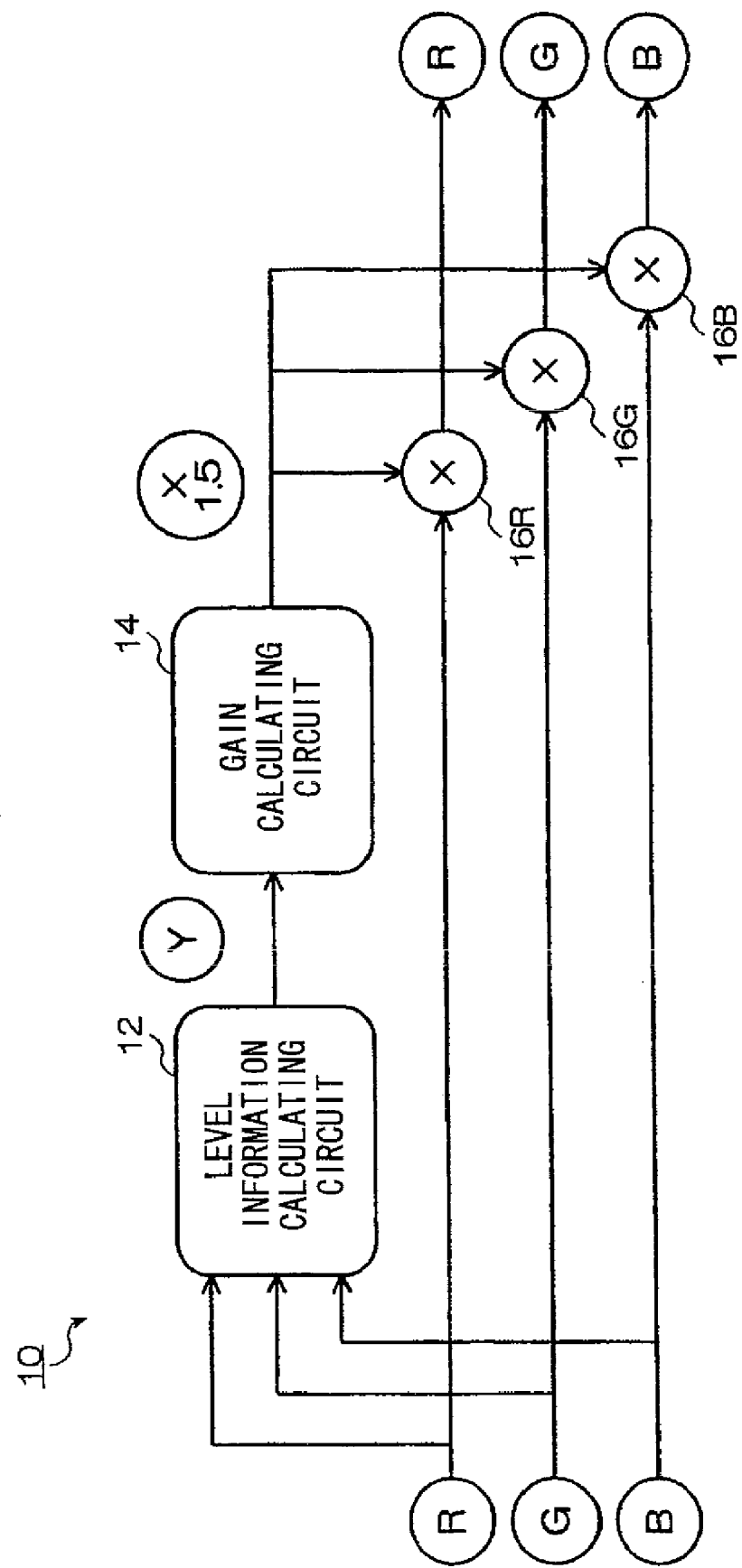

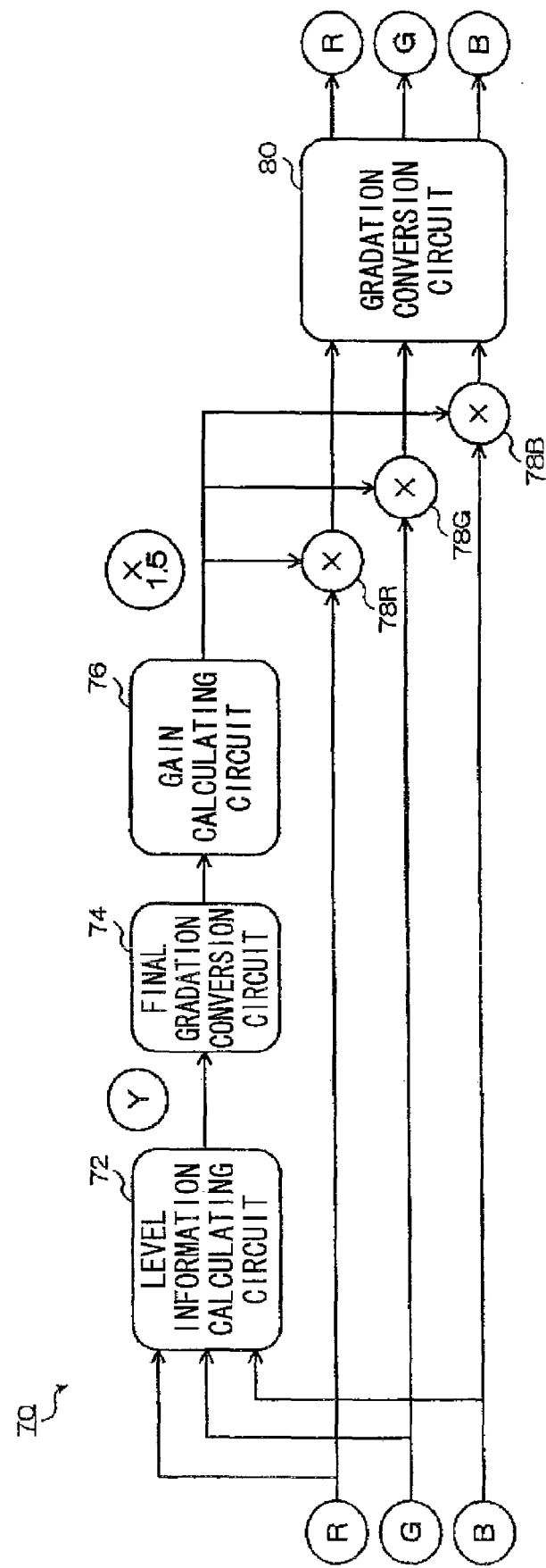

IMAGE PROCESSING APPARATUS, IMAGE PROCESSING METHOD AND IMAGE PICKUP APPARATUS

BACKGROUND OF THE INVENTION

1. Field of the Invention

The present invention relates to an image processing apparatus, an image processing method and an image pickup apparatus, and in particular, to a technique for performing a dynamic range compression.

2. Description of the Related Art

Japanese Patent No. 2748678 discloses a gradation correction device including a luminance signal conversion device which forms a luminance signal from R, G and B signals, a correction coefficient calculation device which calculates a ratio of the result that the luminance signal is gamma-converted to a gradation characteristic of any shaped desired to the luminance signal and a multiplying device which multiplies the output of the correction coefficient calculation device by the R, G and B input signals.

SUMMARY OF THE INVENTION

Hitherto, when a dynamic range compression is performed by converting the gradation of an image signal, the gradient of a lower luminance portion is rendered steep and that of a higher luminance portion is rendered gradual. For this reason, the image signal whose dynamic range is compressed causes a reduction in saturation and contrast because a difference between colors and a variation in level in the higher luminance portion are decreased to easily cause so-called overexposure (flared highlights) and underexposure (crushed blacks).

The present invention has been made in view of these situations and aims to provide an image processing apparatus, an image processing method and an image pickup apparatus capable of providing a good image whose overexposure and underexposure are suppressed by holding information about saturation and contrast at the time of performing a dynamic range compression.

To achieve the above problems, an image processing apparatus according to a first aspect of the present invention includes: an image signal capturing device which captures color signals for each pixel; a level information calculating device which calculates the level information of each pixel by performing a weighted addition to the color signal to increase the ratio of a color signal the level of which is high among the color signals; a gain calculating device which calculates a gain by which the color signals of each pixel are multiplied based on the level information; and a multiplying device which multiplies the color signals of each pixel by the gain.

According to the first aspect of the present invention, each color signal is multiplied by the gain calculated based on the level information of each pixel to allow controlling the signal level of each pixel (or, brightness) while the ratio between the levels of the color signals is maintained. This enables preventing a decrease in saturation which causes a problem at the time of gradation conversion processing (or, a gamma conversion).

An image processing apparatus according to a second aspect of the present invention includes: an image signal capturing device which captures color signals for each pixel; a level information calculating device which calculates the level information of each pixel from the color signal; a filtering device which filters the level information of a pixel to be processed using the level information of pixels in an area peripheral to the pixel to be processed; a gain calculating device which calculates a gain by which the color signal of the pixel to be processed is multiplied based on a reference value obtained by filtering the level information; and a multiplying device which multiplies the color signals of each pixel by the gain.

According to a second aspect of the present invention, the level information of peripheral pixels is taken into consideration when the gain is calculated to permit holding information about the dispersion of level information between pixels and modulating the level of an image while the contrast of the image is left.

An image processing apparatus according to a third aspect of the present invention includes: an area discriminating device which discriminates an area using pixels in an area peripheral to a pixel to be processed; a filtering device which filters the level information of the pixel to be processed using the level information discriminated by the area discriminating device; a gain calculating device which calculates a gain by which the color signal of the pixel to be processed is multiplied based on a reference value obtained by filtering the level information; and a multiplying device which multiplies the color signals of each pixel by the gain.

According to the third aspect of the present invention, the gain is calculated based on a reference value obtained by filtering peripheral pixels the level information of which is close to that of the pixel to be processed to enable a comfortable dynamic range compression even in a boundary portion where level information is high and low.

An image processing apparatus according to a fourth aspect of the present invention includes: an image signal capturing device which captures color signals for each pixel; a level information calculating device which calculates the level information of each pixel from the color signal; a final gradation conversion device which calculates an output with the level information input from the level information calculating device as an input using an undistorted final gradation conversion curve representing a relationship of input and output in the case where the color signals are multiplied by a predetermined gain to perform a dynamic range compression process and subjected to a gradation conversion processing according to a predetermined gradation conversion curve; a gain calculating device which inversely calculates a gain from the output calculated by the final gradation conversion device and the predetermined gradation conversion curve at the time of the gradation conversion processing; and a multiplying device which multiplies the color signals of each pixel by the gain.

According to the fourth aspect of the present invention, the distortion of the final gradation curve obtained from the gain and the normal gradation conversion curve can be eliminated to provide a more natural image output.

In the image processing apparatus according to the second to the fourth aspects of the present invention as a fifth aspect thereof, the level information calculating device calculates the luminance information of each pixel from the color signal to calculate the level information of each pixel based on the luminance information.

According to the fifth aspect of the present invention, calculating a gain based on the luminance of each pixel allows performing a level modulation (luminance adjustment) with sensation close to human visual performance.

In the image processing apparatus according to the second to the fourth aspects of the present invention as a sixth aspect thereof, the level information calculating device calculates the level information of each pixel by performing a weighted addition to the color signal to increase the ratio of a color signal the level of which is high among the color signals.

According to the sixth aspect of the present invention, since the weighted addition (mixing) is performed to increase the ratio of a color signal the level of which is high among the color signals, a color component attenuated by a transmission through and a reflection from a lens out of the color components of a light source at the time of image pickup can be compensated, enabling a level modulation using brightness close to a light source at the time of image pickup.

The image processing apparatus according to the first to the sixth aspects of the present invention as a seventh aspect thereof further includes a gradation conversion device which applies a gradation conversion processing to the color signals of each pixel, the color signals having been multiplied by the gain by the multiplying device and output.

According to the seventh aspect of the present invention, color signals are multiplied by the gain to perform the dynamic range compression with the image signal being antilogarithmic, thereafter, the image signal is rendered to be logarithmic by the gradation conversion processing, thereby obtaining an image near to a human visual performance.

An image pickup apparatus according to an eighth aspect of the present invention includes the image processing apparatus according to the first to the eight aspects of the present invention.

According to the eighth aspect of the present invention, an image subject to the dynamic range compression in real time by the above dynamic range compression process can be picked up.

An image processing method according to a ninth aspect of the present invention includes: an image signal capturing step for capturing color signals for each pixel; a level information calculating step for calculating the level information of each pixel from the color signal; a gain calculating step for calculating the level information of each pixel by performing a weighted addition to the color signal to increase the ratio of a color signal the level of which is high among the color signals; a multiplying step for multiplying the color signals of each pixel by the gain.

An image processing method according to a tenth aspect of the present invention includes: an image signal capturing step for capturing color signals for each pixel; a level information calculating step for calculating the level information of each pixel from the color signal; a filtering step for filtering the level information of a pixel to be processed using the level information of pixels in an area peripheral to the pixel to be processed; a gain calculating step for calculating a gain by which the color signal of the pixel to be processed is multiplied based on a reference value obtained by filtering the level information; and a multiplying step for multiplying the color signals of each pixel by the gain.

An image processing method according to an eleventh aspect of the present invention includes: an area discriminating step for discriminating an area using pixels in an area peripheral to a pixel to be processed; a filtering step for filtering the level information of the pixel to be processed using the level information discriminated at the area discriminating step; a gain calculating step for calculating a gain by which the color signals of the pixel to be processed are multiplied based on a reference value obtained by filtering the level information; and a multiplying step for multiplying the color signals of each pixel by the gain.

An image processing method according to a twelfth aspect of the present invention includes: an image signal capturing step for capturing color signals for each pixel; a level information calculating step for calculating the level information of each pixel from the color signal; a final gradation conversion step for calculating an output with the level information input at the level information calculating step as an input using an undistorted final gradation conversion curve representing a relationship of input and output in the case where the color signals are multiplied by a predetermined gain to perform a dynamic range compression process and subjected to a gradation conversion processing according to a predetermined gradation conversion curve; a gain calculating step for inversely calculating a gain from the output calculated at the final gradation conversion step and the predetermined gradation conversion curve at the time of the gradation conversion processing; and a multiplying step for multiplying the color signals of each pixel by the gain.

At the level information calculating step according to the tenth to the twelfth aspects of the present invention as a thirteen aspect thereof, the luminance information of each pixel is calculated from the color signals to calculate the level information of each pixel based on the luminance information.

At the level information calculating step according to the tenth to the twelfth aspects of the present invention as a fourteenth aspect thereof the level information of each pixel is calculated by performing a weighted addition to the color signal to increase the ratio of a color signal the level of which is high among the color signals.

The image processing method according to the ninth to fourteenth aspects of the present invention as a fifteenth aspect thereof, further includes a gradation conversion step for applying a gradation conversion processing to the color signals of each pixel, the color signals having been multiplied by the gain at the multiplying step and output.

An image processing program causing a computer to perform the steps of the processes performed by the image processing methods according to any of the tenth to fourteenth aspects may also achieve the object of the present invention by causing the computer on which the program is installed to execute the program so as to implement the image processing apparatus. The program may be recorded on a recording medium or a computer program product.

According to the present invention, each color signal is multiplied by the gain calculated based on level information of each pixel to allow controlling the signal level of each pixel (or, brightness) while the ratio between the level of each color signal is maintained. This enables preventing a decrease in saturation and contrast which produces a problem when a gradation conversion processing (or, a gamma conversion) is performed.

BRIEF DESCRIPTION OF THE DRAWINGS

FIG. 1 is a block diagram illustrating the main configuration of an image processing apparatus according to a first embodiment;

FIG. 20 is a block diagram illustrating the main configuration of an image processing apparatus according to a sixth embodiment;

DETAILED DESCRIPTION OF THE PREFERRED EMBODIMENTS

The preferred embodiments of the image processing apparatus, the image processing method and the image pickup apparatus according to the present invention are described below with reference to the accompanied drawings.

First Embodiment

FIG. 1 is a block diagram illustrating the main configuration of the image processing apparatus according to the first embodiment of the present invention. FIGS. 2A, 2B, 2C and 2D are diagrams describing a dynamic range compression process according to the present embodiment.

As illustrated in FIG. 1, an image processing apparatus 10 according to the present embodiment is one for applying a dynamic range compression process to image data (for example, RAW data) and includes a level information calculating circuit 12, a gain calculating circuit 14 and multiplying circuits 16 (16R, 16G and 16B).

Figure 2A:
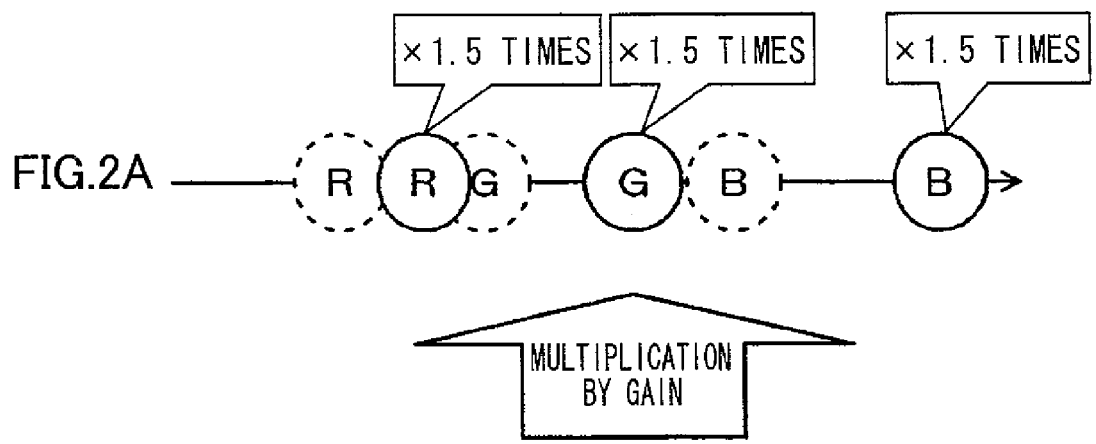
FIGS. 2A, 2B, 2C and 2D are diagrams describing a dynamic range compression process according to the first embodiment.
Figure 2B:
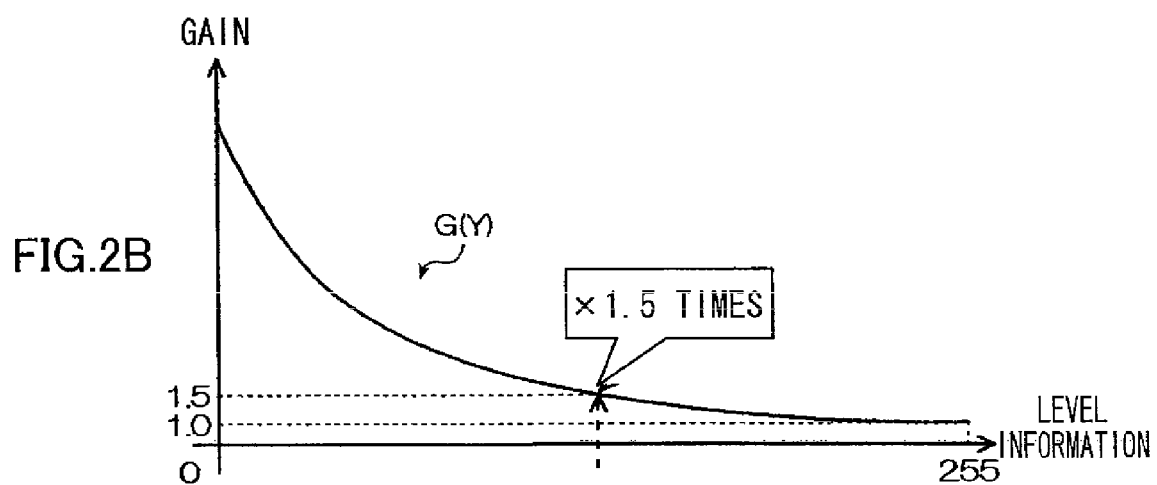
Figure 2C:
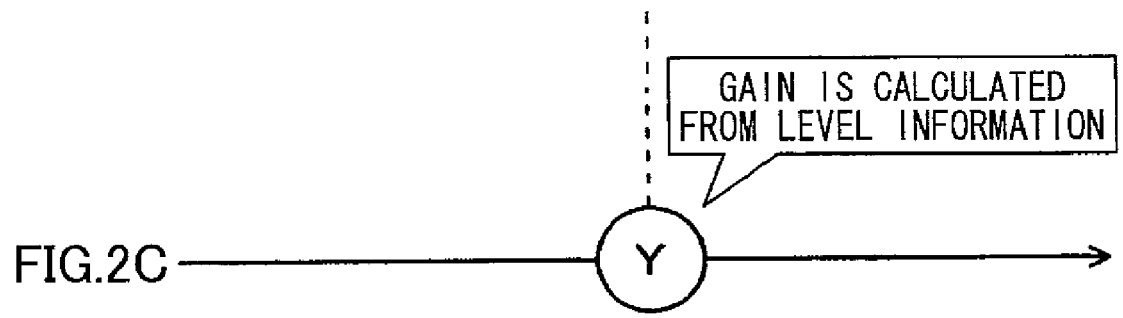
Figure 2D:
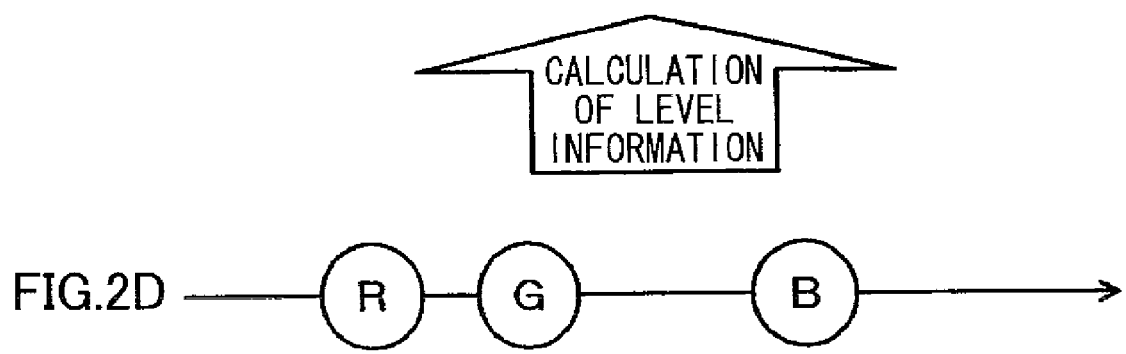

As illustrated in FIG. 2D, the level information calculating circuit 12 calculates the level information of each pixel from R, G and B image signals for each pixel input from an image file (for example, RAW data) or an image pickup portion. The level information is, for example, luminance information representing the luminance of each pixel herein. An example of the level information is described in detail in a second and further following embodiments.

As illustrated in FIG. 2C, the gain calculating circuit 14 refers to a gain table G(Y) based on the level information of each pixel calculated by the level information calculating circuit 12 and calculates a gain (for example, 1.5) by which the R, G and B signals of each pixel are multiplied. The multiplying circuits 16R, 16G and 16B multiply the R, G and B signals by the gain respectively.

The gain table G(Y) is one representing a relationship between the level information and the gain and is stored in a memory (not shown) of the image processing apparatus 10. As illustrated in FIG. 2B, for example, the gain is set so as to be minimized (=1.0) at the maximum of the level information (or, luminance) and to be increased as the luminance is decreased. In the present embodiment, the R, G and B signals are multiplied by the gain calculated based on the level information of each pixel to allow controlling the signal level (or, brightness) of each pixel while the ratio between the levels of the R, G and B signals is maintained, as illustrated in FIG. 2A. Performing a dynamic range compression in the above manner enables preventing a decrease in saturation which causes a problem at the time of performing a gradation conversion processing (or, a gamma conversion).

Figure 3:
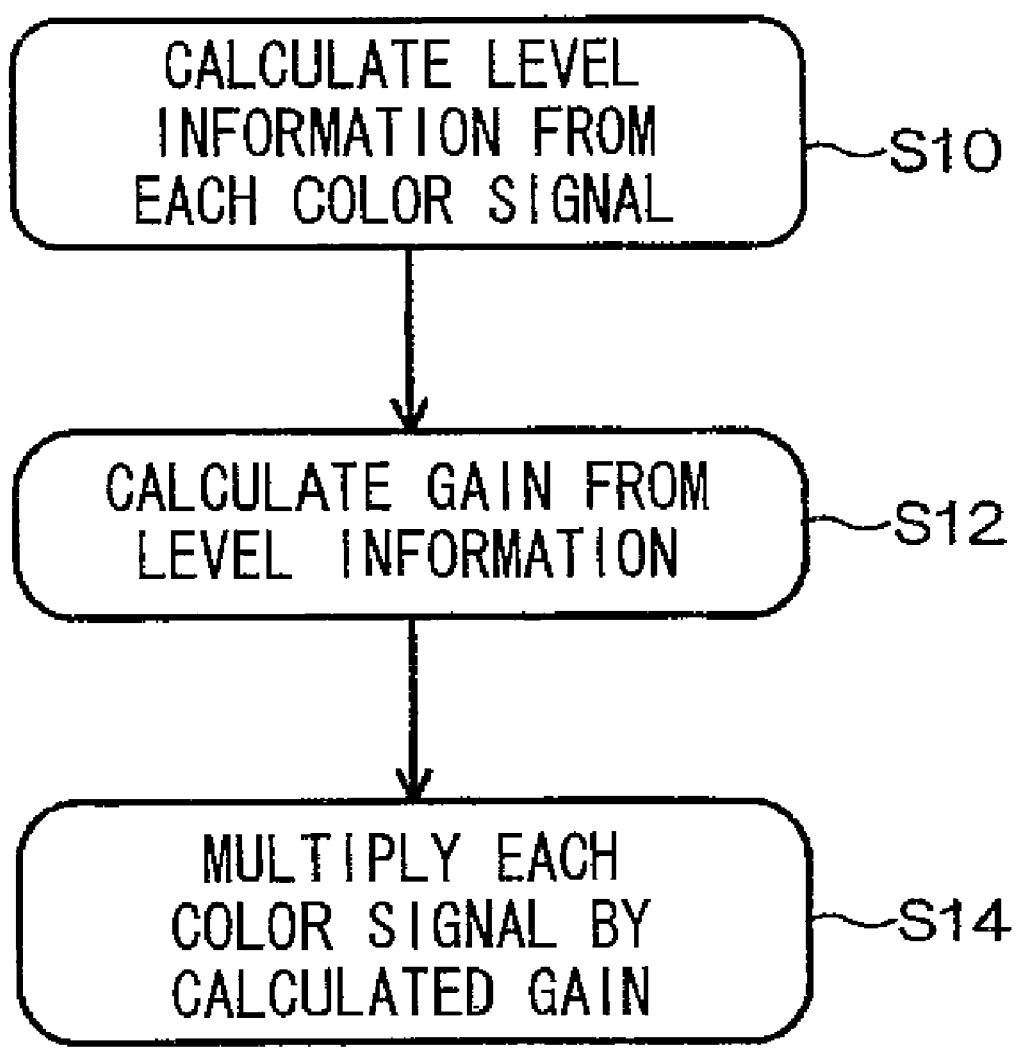
FIG. 3 is a flow chart illustrating the flow of the dynamic range compression process according to the first embodiment.

FIG. 3 is a flow chart illustrating the flow of the dynamic range compression process according to the present embodiment. When the R, G and B color signals are input, the level information calculating circuit 12 calculates level information of each pixel (step S10). Then, the gain calculating circuit 14 calculates a gain by which the color signals of each pixel are multiplied from the level information of each pixel (step S12) and each color signal is multiplied by the gain (step S14).

According to the present embodiment, each color signal is multiplied by the gain calculated based on the level information of each pixel to allow controlling the signal level (or, brightness) of each pixel while the ratio between the levels of the color signals is maintained. This enables preventing a decrease in saturation which causes a problem at the time of gradation conversion processing (or, a gamma conversion).

In the present embodiment, although a level is calculated from the R, G and B signals and subjected to the dynamic range compression, signals such as, for example, luminance/color difference signal (Y/C signal, Y, Cb and Cr), Lab (Lab color) and others may be subjected to the dynamic range compression.

Figure 4:
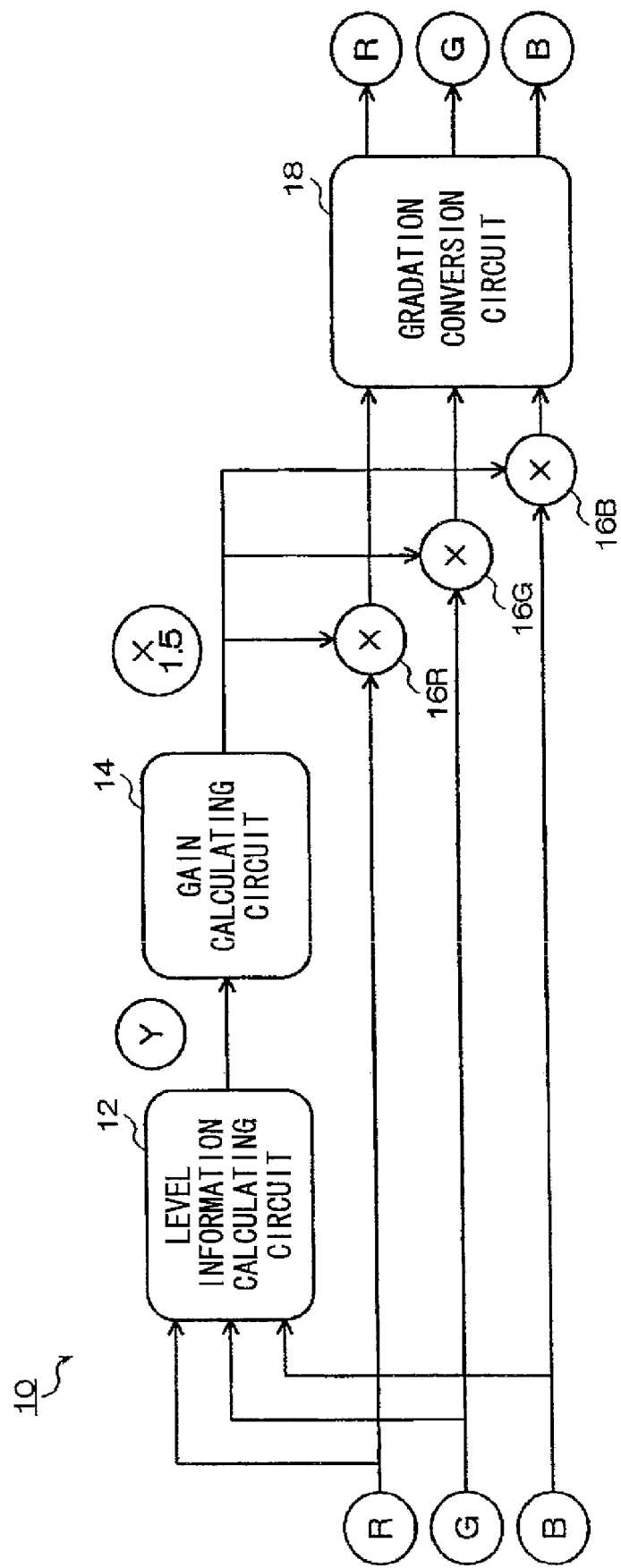
FIG. 4 is a block diagram illustrating an example in which a gradation conversion circuit is connected to the image processing apparatus according to the first embodiment.
Figure 5:
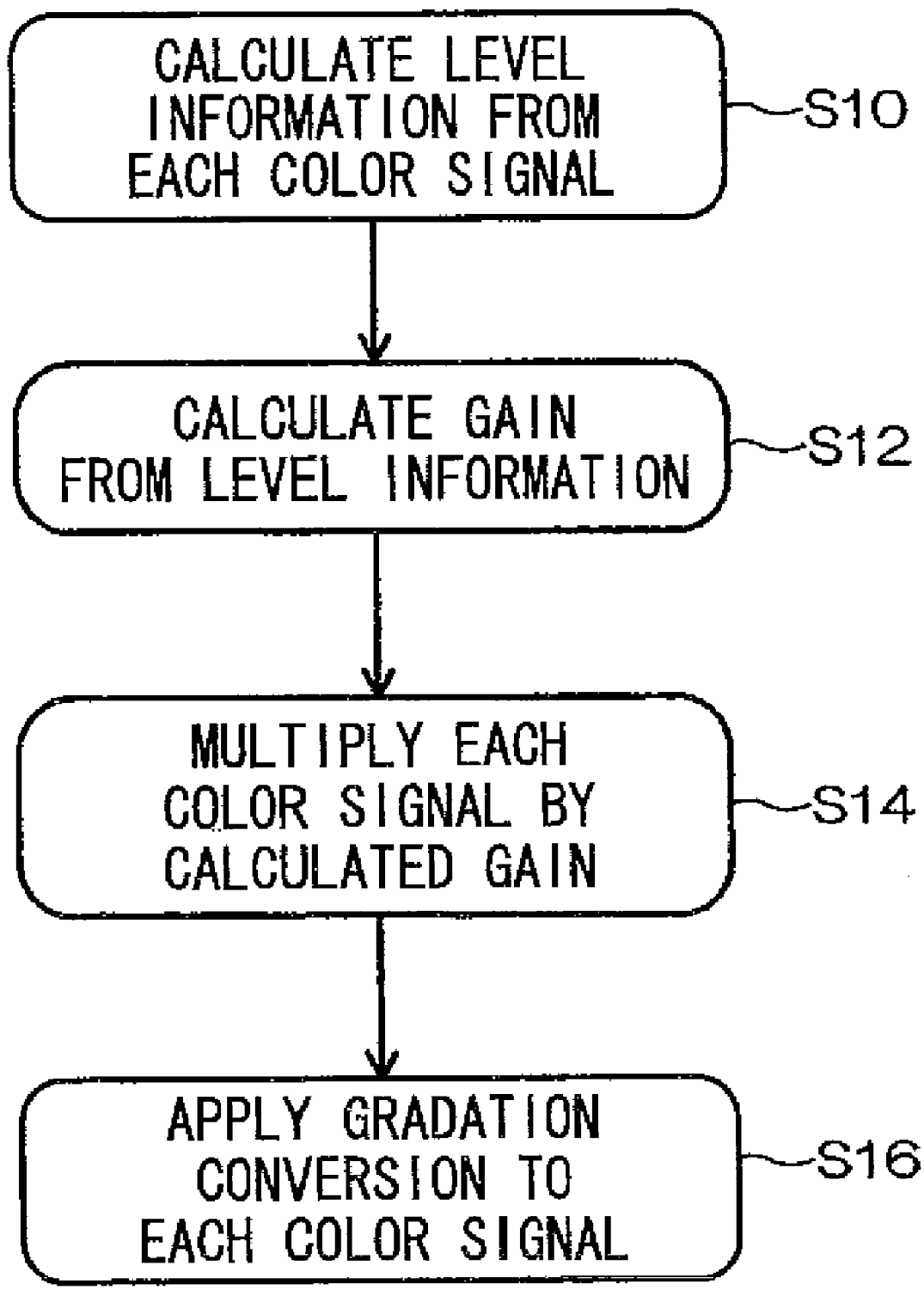
FIG. 5 is a flow chart illustrating the flow of the gradation conversion processing.

The gradation conversion processing according to the present embodiment is described below. FIG. 4 is a block diagram illustrating an example in which a gradation conversion circuit is connected to the image processing apparatus according to the present embodiment. FIG. 5 is a flow chart illustrating the flow of the gradation conversion processing.

In the example illustrated in FIG. 4, a gradation conversion circuit 18 is provided at the rear stage (or, at the output) of the multiplying circuits 16. The color signals of each pixel are multiplied by the gain at the multiplying circuits 16 (step S14)

and then, gradation-converted (gamma conversion) in the gradation conversion circuit 18 (step S16).

As described above, the gradation conversion processing is performed after the dynamic range compression process has been performed. That is to say, an antilogarithmic image-signal is subjected to the dynamic range compression process, thereafter, the image signal is rendered to be a logarithmic image-signal by the gradation conversion processing, thereby obtaining an image near to a human visual performance.

Figure 6:
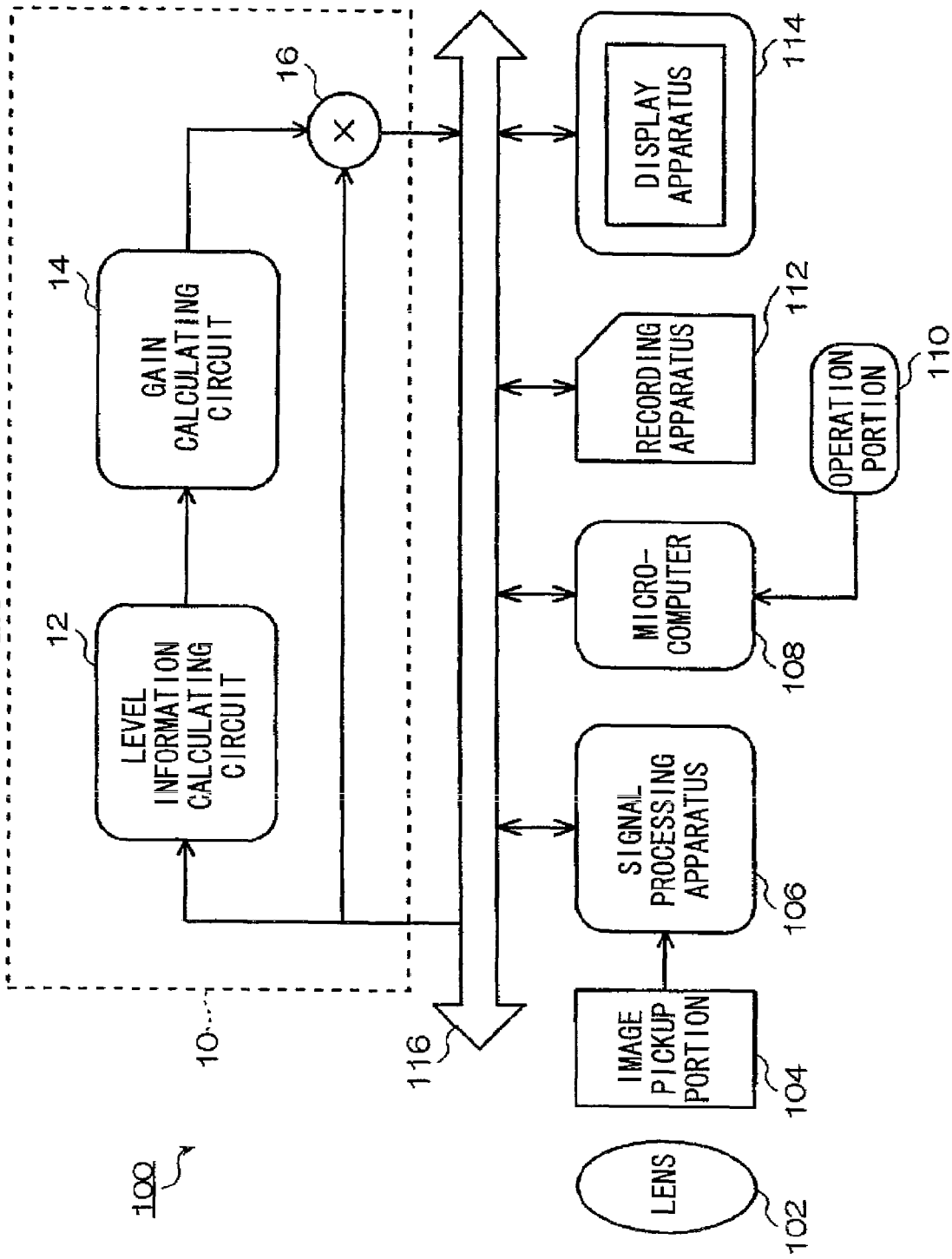
FIG. 6 is a block diagram illustrating the main configuration of an image pickup apparatus with the image processing apparatus according to the first embodiment.

Example in which the Image Processing Apparatus According to the First Embodiment is Applied to an Image Pickup Apparatus An example is described below in which the image processing apparatus according to the first embodiment is applied to an image pickup apparatus. FIG. 6 is a block diagram illustrating the main configuration of an image pickup apparatus with the image processing apparatus according to the first embodiment of the present invention. As illustrated in FIG. 6, an image pickup apparatus 100 according to the present embodiment includes a lens 102, an image pickup portion 104, a signal processing apparatus 106, a microcomputer 108, an operation portion 110, a recording apparatus 112 and a display apparatus 114.

The microcomputer 108 is connected to each circuit of the image pickup apparatus 100 through a bus 116 and controls the operation of each portion of the image pickup apparatus 100. The microcomputer 108 includes a ROM for storing the control program for the image pickup apparatus 100, a RAM for supplying a work area required for executing the program and an image processing area for processing an image, an EEPROM for storing user setting information, and a timer. The microcomputer 108 receives a signal from the operation portion 110 and controls each circuit of the image pickup apparatus 100 to perform, for example, a lens drive control, an image pickup operation control, an automatic exposure control (AE)/an automatic focus control (AF), an image processing control, an image data recording/a reproduction control and a display control for the display apparatus 114.

The operation portion 110 is a device by which a user performs various manual inputs and includes a power supply switch, a release switch, an operation mode changeover switch and various setting buttons. The power supply switch is an operating device which turns on and off the power supply of the image pickup apparatus 100. The release switch is an operating device which inputs the instruction of start of image pickup and is formed of a two-stroke switch with an S1 switch which is turned on when half depressed and an S2 switch which is turned on when fully depressed. The operation mode changeover switch is an operating device which changes over an image pickup mode for picking up an image and a reproduction mode for reproducing the picked up image.

The display apparatus 114 is one (for example, a liquid crystal display) for displaying an image. The display apparatus 114 is used as an electronic finder for confirming a viewing angle in an image pickup mode and as a preview for the picked up image. The display apparatus 114 displays a reproduced image read from the recording apparatus 112 fitted to the image pickup apparatus 100 in a reproduction mode.

The recording apparatus 112 is one for recording the picked up image data. As the recording apparatus 112, there may be used, various media such as, for example, semiconductor memory cards typified by an xD picture card (registered trademark) and a smart media (registered trademark), a portable small hard disc, a magnetic disk, an optical disk and a magneto optical disk.

The image pickup portion 104 is a block for picking up an object and includes image sensors (for example, three color CCD solid state image sensors) for receiving object light incident through the lens 102. The image signals (R, G and B signals) for each pixel read from the image sensors are sampled and held (correlated double sampling processing) and then amplified at the image pickup portion 104, thereafter, the amplified image signals are analog-to-digital converted and input to the image processing apparatus 10.

The image processing apparatus 10 subjects the R, G and B signals input from the image pickup portion 104 to the dynamic range compression process illustrated in FIGS. 2 and 3. The R, G and B signals subjected to the dynamic range compression process are input to the signal processing apparatus 106.

The signal processing apparatus 106 is an image processing device including a white balance adjustment circuit, a gradation conversion processing circuit (gamma conversion circuit), a contour correction circuit and a luminance and color difference signal generating circuit. The signal processing apparatus 106 subjects the R, G and B signals input from the image processing apparatus 10 to prescribed processing such as a white balance adjustment processing, a gradation conversion processing (gamma conversion) and a contour correction processing, and converts the R, G and B signals to a luminance/color-difference signal (Y/C signal).

If the operation mode is set to the image pickup mode, a live image of an object (or, a through-the-lens image) is displayed. If a picked up image is displayed live (live camera), the image signal converted to the Y/C signal in the signal processing apparatus 106 is sent to the display apparatus 114 through the bus 116. The display apparatus 114 converts the input image data to a video signal of a predetermined system (for example, a color composite image signal of the NTSC (NTSC: National Television System Committee) system) to display the video signal.

Half depressing the release switch (S1 ON) in the image pickup mode starts the AE/AF processing. Then, fully depressing the release switch (S2 ON) starts the image pickup operation for recording. The image signals (or, R, G and B signals) captured by the image pickup portion 104 are input to the image processing apparatus 10 in response to the S2 ON, subjected to the dynamic range compression process and then input to the signal processing apparatus 106. The image signals input to the signal processing apparatus 106 are subjected to a predetermined processing such as a white balance adjustment processing, a gradation conversion processing (gamma conversion) and a contour correction processing, converted to a luminance/color-difference signal (Y/C signal), compressed in accordance with a predetermined format and recorded in the recording apparatus 112. The image signals are recorded as the image file of, for example, Joint Photographic Experts Group (JPEG) format for a still picture and Audio Video Interleaving (AVI) for a moving picture.

If the operation mode is set to the reproduction mode, the compressed data of the latest image file (the last image file recorded) recorded in the recording apparatus 112 is read. If the image file related to the latest recording is a still-picture file, the read image compression data is expanded to non-compressed Y/C signal by the microcomputer 108, converted to a signal for display and then output to the display apparatus 114. Thus, the content of the image file is displayed on a screen of the display apparatus 114.

According to the image pickup apparatus of the present embodiment, an image whose dynamic range is compressed in real time by the above dynamic range compression process can be picked up.

Although the image pickup apparatus 100 according to the present embodiment uses the three color CCD solid state image sensors, the image pickup apparatus 100 may use a single CCD to perform a simultaneous processing (or, a processing for interpolating the spatial shift of a color signal caused by the arrangement of color filters of a single CCD to simultaneously convert a color signal) and then the color signals are input to the image processing apparatus 10.

Second Embodiment

The second embodiment is described below. In the present embodiment, a gain is calculated using the luminance of each pixel as level information to compress a dynamic range.

Figure 7:
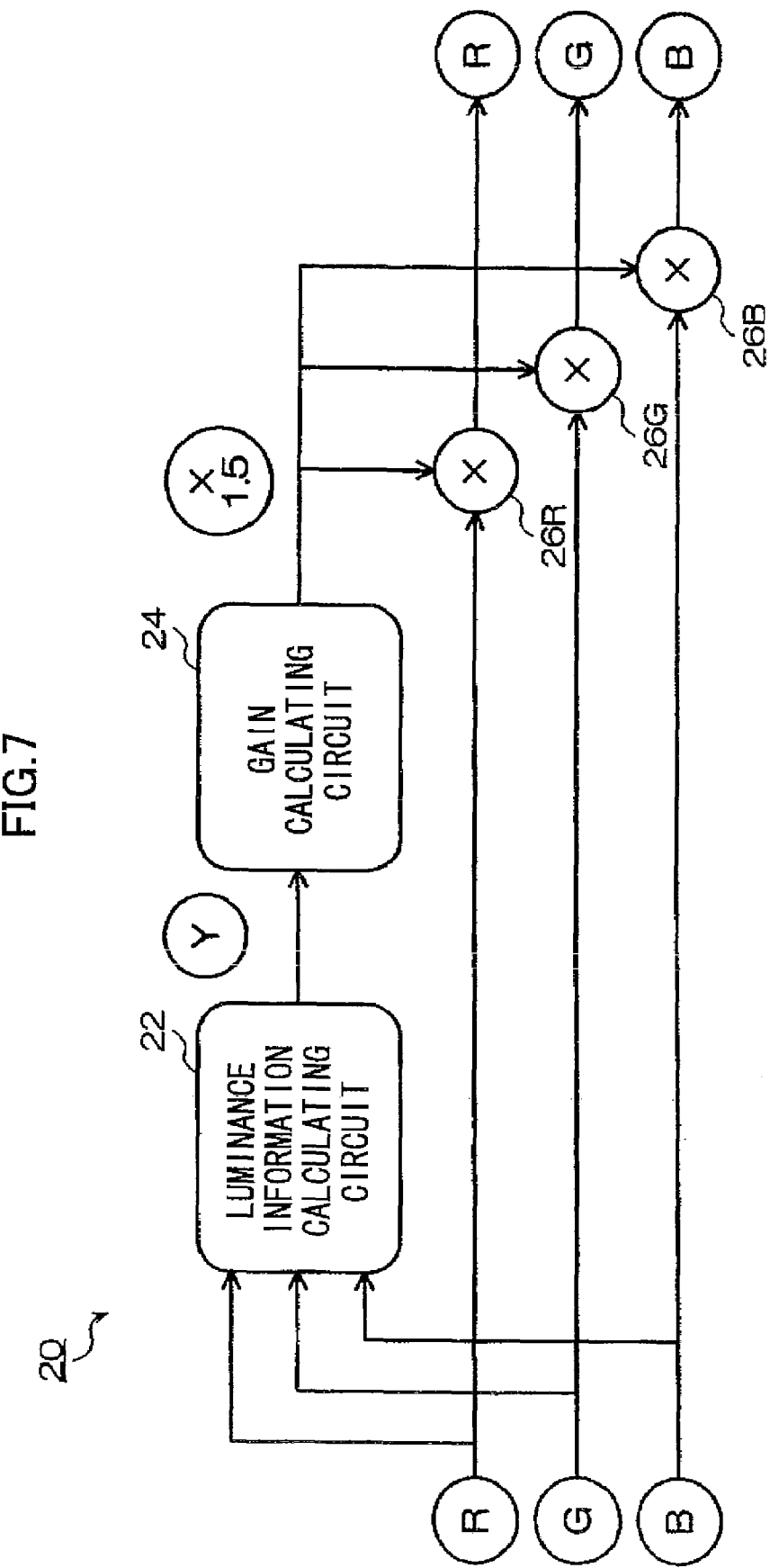
FIG. 7 is a block diagram illustrating the main configuration of an image processing apparatus according to a second embodiment.

FIG. 7 is a block diagram illustrating the main configuration of an image processing apparatus according to the second embodiment of the present invention. As illustrated in FIG. 7, the image processing apparatus 20 according to the present embodiment includes a luminance information calculating circuit 22, a gain calculating circuit 24 and multiplying circuits 26 (26R, 26G and 26B).

The luminance information calculating circuit 22 calculates the luminance (luminance information) of each pixel from the R, G and B signals for each pixel input from an image file (for example, RAW data) or the image pickup portion.

The gain calculating circuit 24 calculates a gain (for example, 1.5) by which the R, G and B signals of each pixel are multiplied, based on the luminance information of each pixel calculated by the luminance information calculating circuit 22 and with reference to a gain table. The multiplying circuits 26R, 26G and 26B multiply the R, G and B signals by the gain.

The gain table is one representing a relationship between the level information and the gain and is stored in a memory (not shown) of the image processing apparatus 20. For example, the gain is set so as to be minimized (=1.0) at the maximum of luminance and to be increased as the luminance is decreased. In the present embodiment, the R, G and B signals are multiplied by the gain calculated based on the level information of each pixel to allow controlling the signal level (or, brightness) of each pixel while the ratio between the levels of the R, G and B signals is maintained. Performing a dynamic range compression in the above manner enables preventing a decrease in saturation which causes a problem at the time of performing a gradation conversion processing (or, a gamma conversion).

Figure 8:
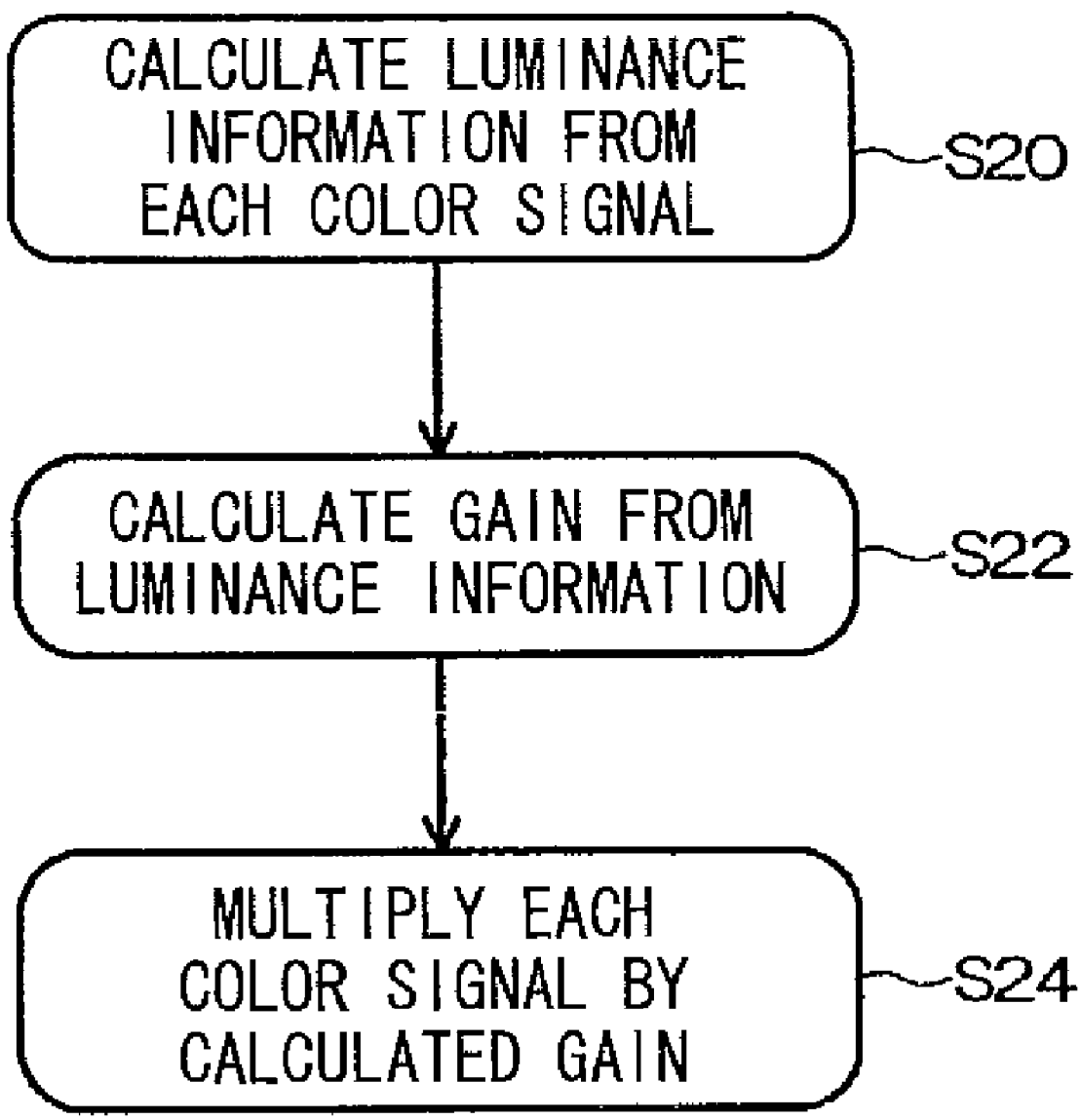
FIG. 8 is a flow chart illustrating the flow of the dynamic range compression process according to the second embodiment.

FIG. 8 is a flow chart illustrating the flow of the dynamic range compression process according to the present embodiment. When the R, G and B color signals are input, the luminance information calculating circuit 22 calculates the luminance of each pixel (step S20). Then, the gain calculating circuit 24 calculates a gain by which the color signals of each pixel are multiplied from the luminance of each pixel (step S22) and each color signal is multiplied by the gain (step S24).

According to the present embodiment, each color signal is multiplied by the gain calculated based on the luminance of each pixel to allow controlling the signal level (or, brightness) of each pixel while the ratio between the levels of the color signals is maintained. This enables preventing a decrease in saturation which causes a problem at the time of performing a gradation conversion processing (or, a gamma conversion). Furthermore, in the present embodiment, calculating a gain based on the luminance of each pixel allows performing a level modulation (luminance adjustment) with sensation close to human visual performance.

As is the case with the first embodiment, the image processing apparatus 20 according to the present embodiment may further include a gradation conversion circuit at the rear stage thereof (or, at the output thereof) and may be mounted on an image pickup apparatus.

Third Embodiment

The third embodiment of the present invention is described below. In the present embodiment, a gain is calculated using a weighted additional value for each color signal as level information to compress a dynamic range.

Figure 9:
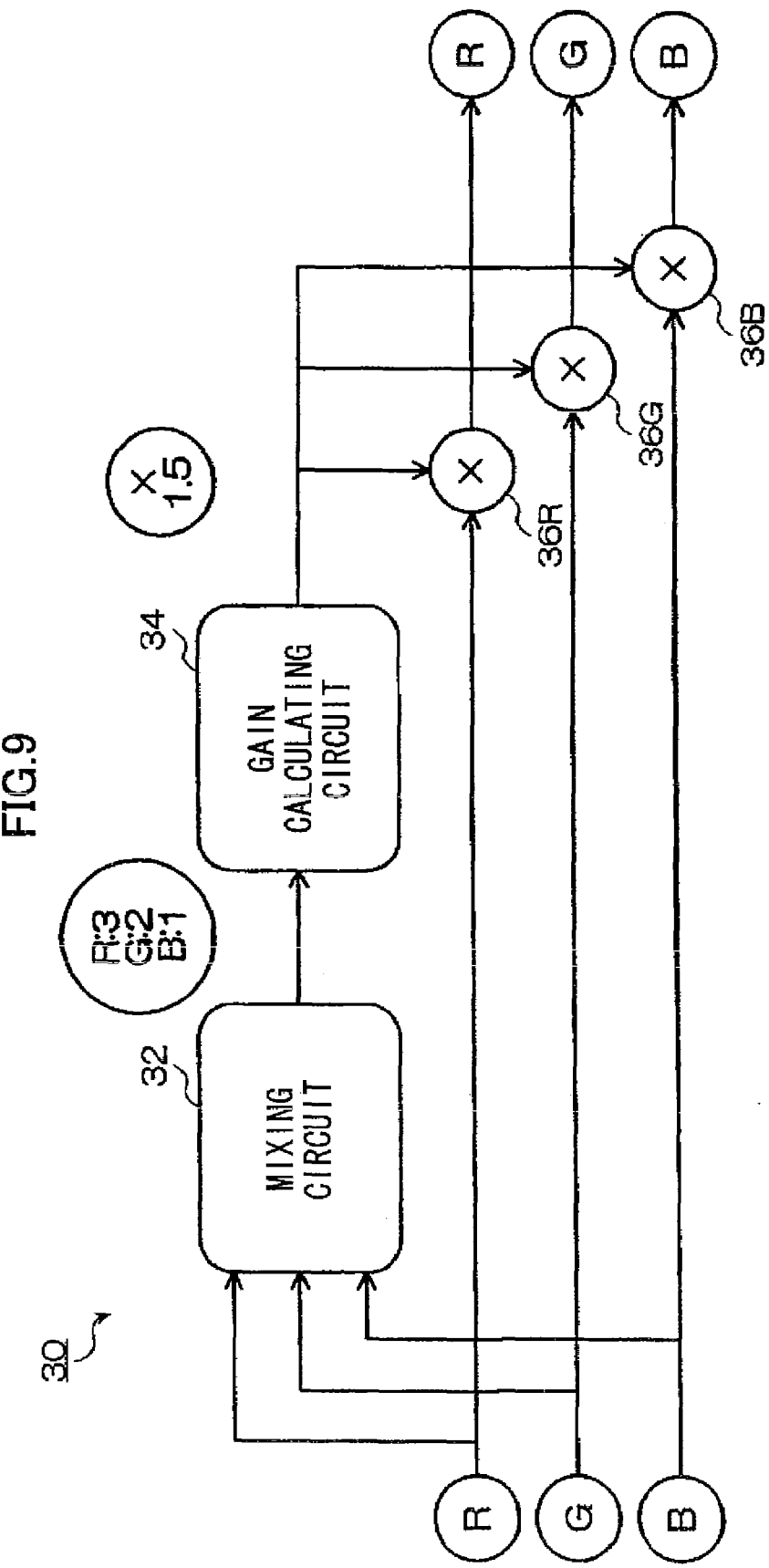
FIG. 9 is a block diagram illustrating the main configuration of an image processing apparatus according to a third embodiment.

FIG. 9 is a block diagram illustrating the main configuration of an image processing apparatus according to the third embodiment of the present invention. As illustrated in FIG. 9, the image processing apparatus 30 includes a mixing circuit 32, a gain calculating circuit 34 and a multiplying circuit 36 (36R, 36G and 36B).

The mixing circuit 32 performs a weighted addition (mixing) of the R, G and B image signals for each pixel input from the image file (for example, RAW data) or the image pickup portion. At the time of performing a weighted addition of each color signal, a color whose level (signal level) is high is highly weighted. For example, in case of R>G>B, the mixture ratio between R, G and B is taken as R:G:B=3:2:1.

The gain calculating circuit 34 refers to a gain table based on the weighted additional values of color signals of each pixel calculated by the mixing circuit 32 and calculates a gain by which the R, G and B signals of each pixel are multiplied. The multiplying circuits 36 (36R, 36G and 36B) multiply the R, G and B signals by the gain respectively.

The gain table is one representing a relationship between the weighted additional value of color signals and the gain and is stored in a memory (not shown) of the image processing apparatus 30. For example, the gain is set so as to be increased as a weighted additional value is decreased. In the present embodiment, the R, G and B signals are multiplied by the gain calculated based on the level information of each pixel to allow controlling the signal level (or, brightness) of each pixel while the ratio between the levels of the R, G and B signals is maintained. Performing a dynamic range compression in the above manner enables preventing a decrease in saturation which causes a problem at the time of performing a gradation conversion processing (or, a gamma conversion).

Figure 10:
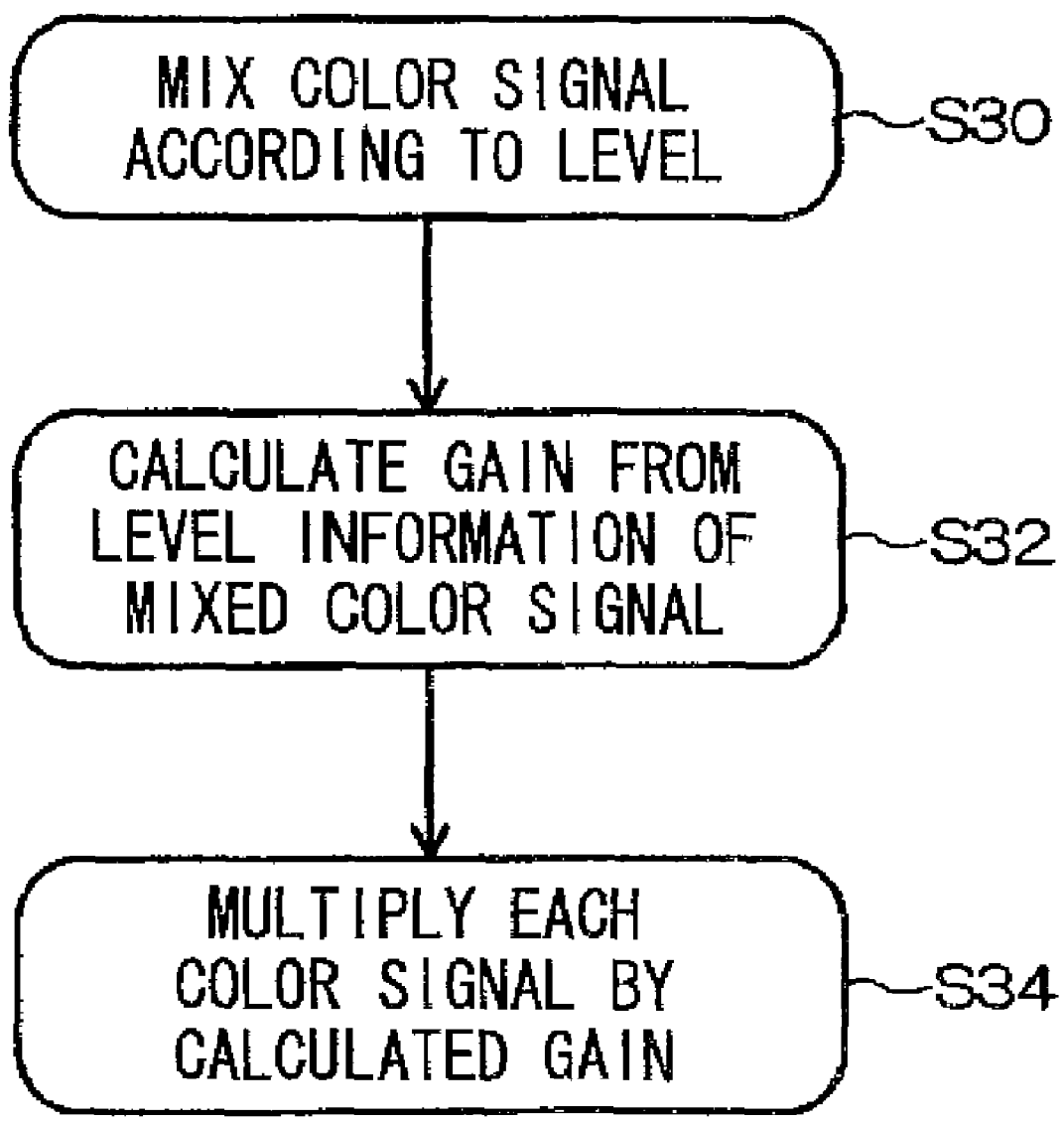
FIG. 10 is a flow chart illustrating the flow of the dynamic range compression process according to the third embodiment.

FIG. 10 is a flow chart illustrating the flow of the dynamic range compression process according to the present embodiment. When the R, G and B color signals are input, the mixing circuit 32 calculates the weighted additional value of the color signals of each pixel (step S30). Then, the gain calculating circuit 34 calculates a gain by which the color signals of each pixel are multiplied from the luminance of each pixel (step S32) and each color signal is multiplied by the gain (step S34).

According to the present embodiment, each color signal is multiplied by the gain calculated according to the weighted additional value of color signals of each pixel to allow controlling the signal level (or, brightness) of each pixel while the ratio between the levels of the color signals is maintained. This enables preventing a decrease in saturation which causes a problem at the time of performing a gradation conversion processing (or, a gamma conversion). Furthermore, in the present embodiment, since the weighted addition is performed to increase the ratio of a color signal the level of which is high among the R, G and B signals, a color component attenuated by a transmission through and a reflection from a lens out of the color components of a light source at the time of image pickup can be compensated, enabling a level modulation using brightness close to a light source at the time of image pickup.

As is the case with the first embodiment, the image processing apparatus 30 according to the present embodiment may further include a gradation conversion circuit at the rear stage thereof (at the output thereof) and may be mounted on an image pickup apparatus.

Fourth Embodiment

Figure 11:
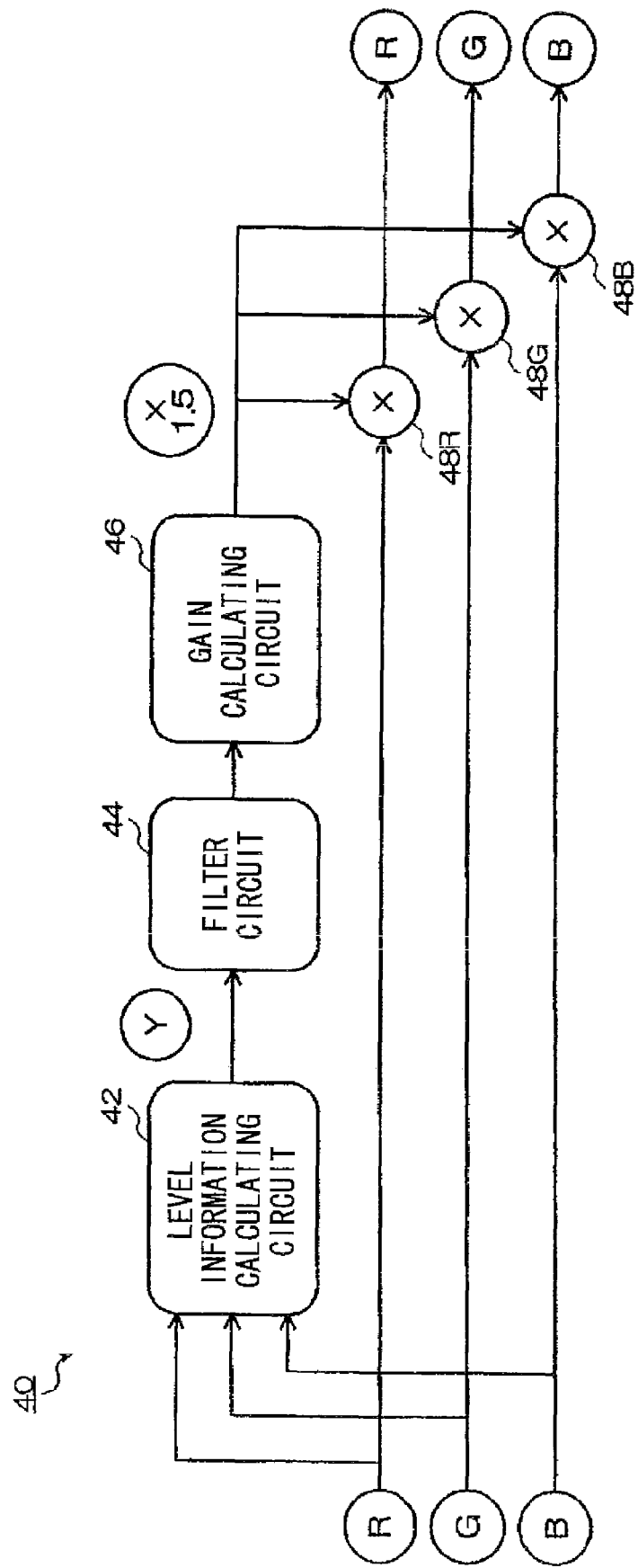
FIG. 11 is a block diagram illustrating the main configuration of an image processing apparatus according to a fourth embodiment.

The fourth embodiment of the present invention is described below. FIG. 11 is a block diagram illustrating the main configuration of an image processing apparatus according to the fourth embodiment of the present invention. FIGS. 12A, 12B, 12C, 12D and 12E are diagrams describing the dynamic range compression process according to the present embodiment.

As illustrated in FIG. 11, an image processing apparatus 40 according to the present embodiment includes a level information calculating circuit 42, a filter circuit 44, a gain calculating circuit 46 and multiplying circuits 48 (48R, 48G and 48B).

Figure 12A:
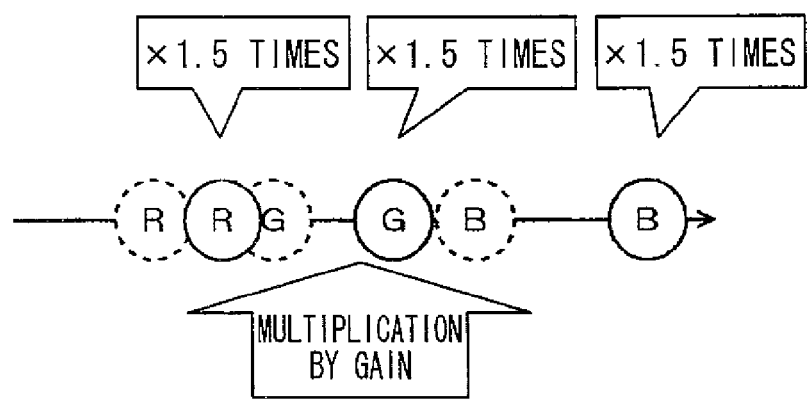
FIGS. 12A, 12B, 12C, 12D and 12E are diagrams describing the dynamic range compression process according to the fourth embodiment.
Figure 12B:
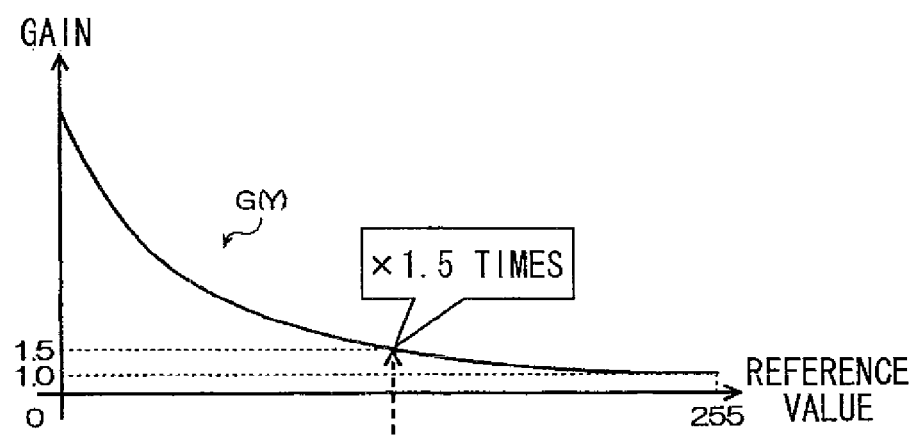
Figure 12C:
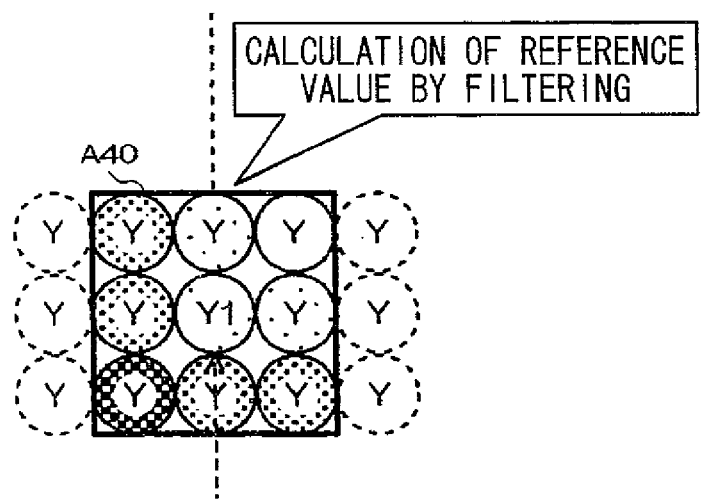
Figure 12D:
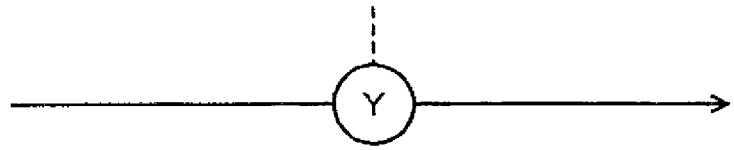
Figure 12E:
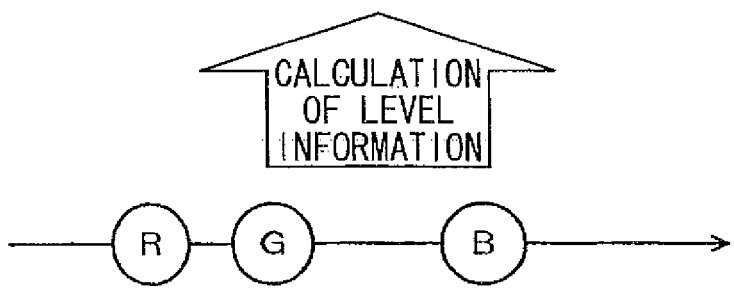

The level information calculating circuit 42 calculates level information (for example, luminance) from R, G and B image signals for each pixel input from an image file (for example, RAW data) or an image pickup portion. When the image processing apparatus 40 calculates a gain by which a target pixel (level=Y1) is multiplied, as illustrated in FIG. 12C, the image processing apparatus 40 holds level information of pixels included in an area A40 peripheral to the target pixel (for example, an area of 3 pixels×3 pixels around the target pixel or, for example, an area corresponding to the kernel size of the image processing apparatus 40).

The filter circuit 44 filters the level information of the pixels in the area A40 (for example, through a smoothed filter) to calculate a reference value Y1'.

The gain calculating circuit 46 refers to a gain table G(Y) based on the reference value Y1' and calculates a gain (for example, 1.5) by which the R, G and B signals of each pixel are multiplied. The multiplying circuits 48R, 48G and 48B multiply the R, G and B signals by the gain. The gain table G(Y) is one for representing a relationship between the reference value and the gain and is stored in a memory (not shown) of the image processing apparatus 40. For example, the gain is set so as to be minimized (=1.0) at the maximum of the reference value and increased as the reference value is decreased as illustrated in FIG. 12B.

Figure 13A:
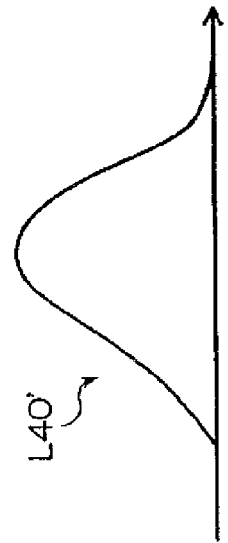
FIGS. 13A, 13B and 13C are graphs describing the calculation process of the reference value Y1' according to the fourth embodiment.
Figure 13B:
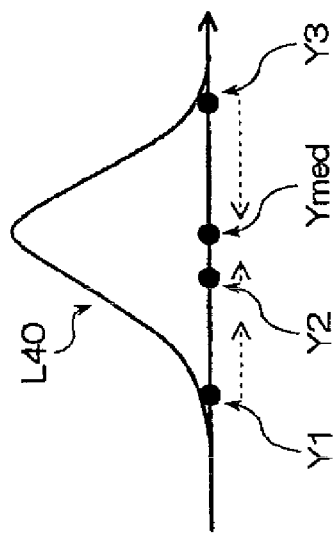
Figure 13C:
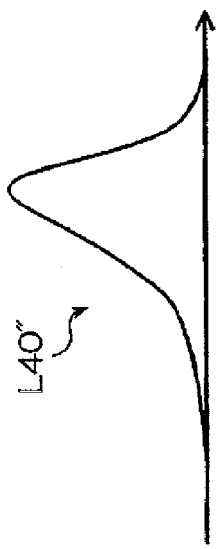

FIGS. 13A, 13B and 13C are graphs describing the calculation process for the reference value Y1'. In FIGS. 13A, 13B and 13C, the abscissa represents the level information of each pixel and the ordinate expresses the number of pixels. Hereinafter, pixels peripheral to the target pixel Y1 are taken as Y2, Y3, . . . , and a distribution function representing the dispersion of level in peripheral pixels is taken as L40 and the medium value of the dispersion of level in peripheral pixels is taken as Ymed.

As illustrated in FIG. 13B, when the level information of the target pixel and peripheral pixels are distributed, gains calculated based on the level information of each pixel vary. As the gains by which the pixels Y1, Y2 and Y3 are multiplied vary, a comparative relationship in level between the target pixel and peripheral pixels spatially close to the target pixel is changed. As illustrated in FIG. 12B, when a gain of a pixel becomes larger as the pixel is closer to the lower level (luminance) side, as illustrated in L40" in FIG. 13C, the level of the pixel on the side of lower level is increased so that the level of the pixel in the image is less dispersed, losing information about the dispersion of pixel level.

In the present embodiment, by performing filtering based on the level of the periphery pixels Y2, Y3, . . . , a value (the reference value Y1') adjusted so as to make the level of the target pixel Y1 close to the medium value Ymed of a distribution function L10, is calculated. Then, the gain G (Y1') is calculated based on the reference value Y1'. That is to say, according to the present embodiment, since the gain is calculated based on the reference value close to the medium value Ymed of the dispersion of the peripheral pixels, as illustrated in L40' in FIG. 13A, information about the dispersion of levels of pixels in the image is held even after the dynamic range compression. Incidentally, the gain may be calculated based on the medium value Ymed.

Figure 14:
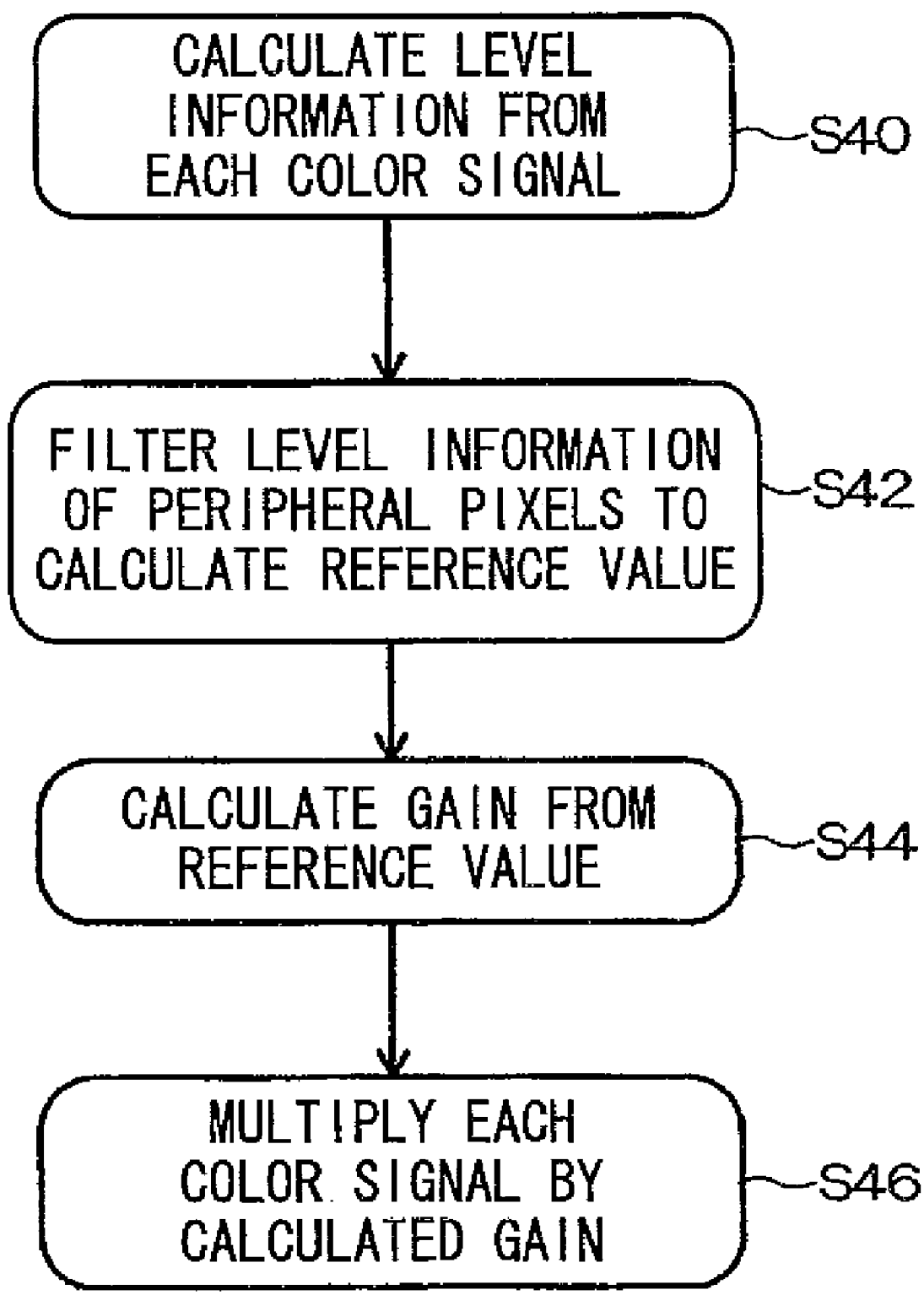
FIG. 14 is a flow chart illustrating the flow of the dynamic range compression process according to the fourth embodiment.

FIG. 14 is a flow chart illustrating the flow of the dynamic range compression process according to the present embodiment. When the R, G and B color signals are input, the level information calculating circuit 42 calculates the level information of each pixel (step S40). Then, each pixel and pixels peripheral thereto are filtered to calculate the reference value Y1' (step S42). The gain calculating circuit 46 calculates a gain by which each color signal of the target pixel Y1 is multiplied from the reference value Y1' (step S44) and each color signal is multiplied by the gain (step S46).

According to the present embodiment, the level information of peripheral pixels is taken into consideration when a gain of a pixel is calculated to permit holding information about the dispersion of level information between pixels and modulating the level of an image while the contrast of the image is left.

As is the case with the first embodiment, the image processing apparatus 40 according to the present embodiment may further include a gradation conversion circuit at the rear stage thereof (at the output thereof) and may be mounted on an image pickup apparatus.

Fifth Embodiment

Figure 15:
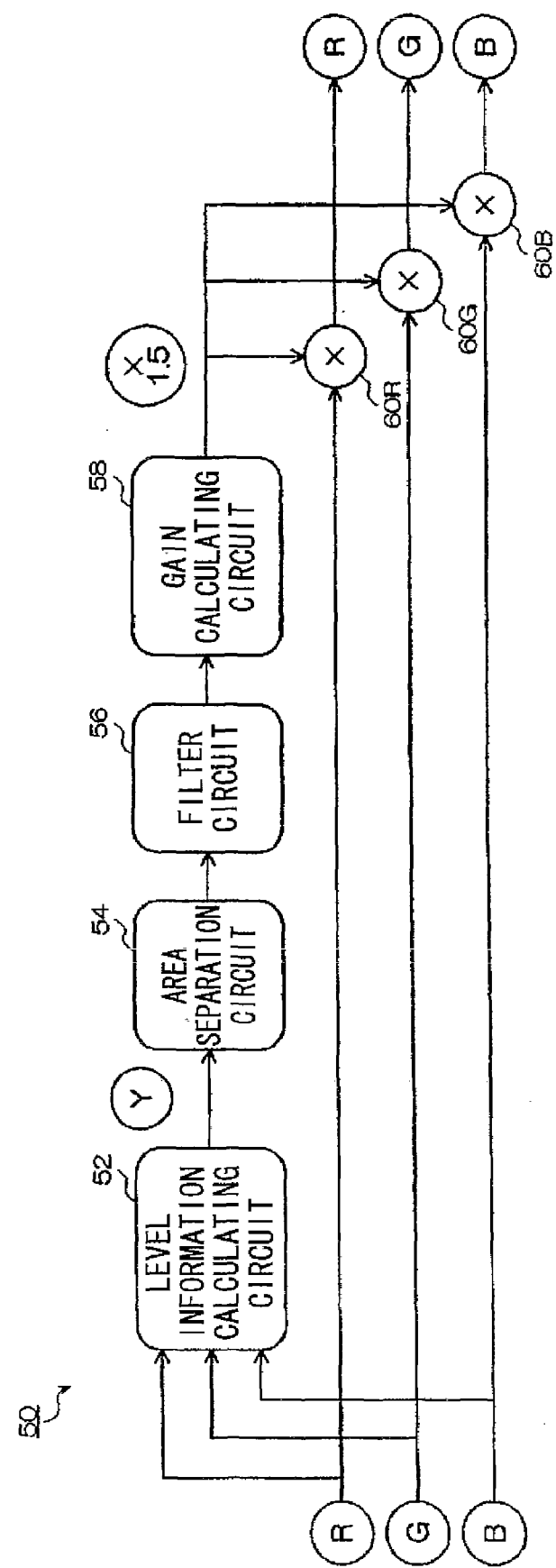
FIG. 15 is a block diagram illustrating the main configuration of an image processing apparatus according to a fifth embodiment of the present invention.

The fifth embodiment of the present invention is described below. FIG. 15 is a block diagram illustrating the main configuration of an image processing apparatus according to the fifth embodiment of the present invention. FIGS. 16A, 16B, 16C, 16D and 16E are diagrams describing the dynamic range compression process according to the present embodiment.

As illustrated in FIG. 15, an image processing apparatus 50 according to the present embodiment includes a level information calculating circuit 52, an area separation circuit 54, a filter circuit 56, a gain calculating circuit 58 and a multiplying circuit 60 (60R, 60G and 60B).

Figure 16A:
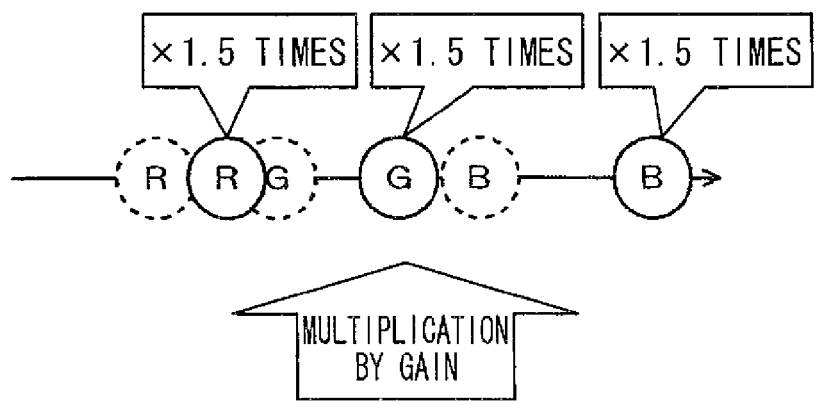
FIGS. 16A, 16B, 16C, 16D and 16E are diagrams describing the dynamic range compression process according to the fifth embodiment.
Figure 16B:
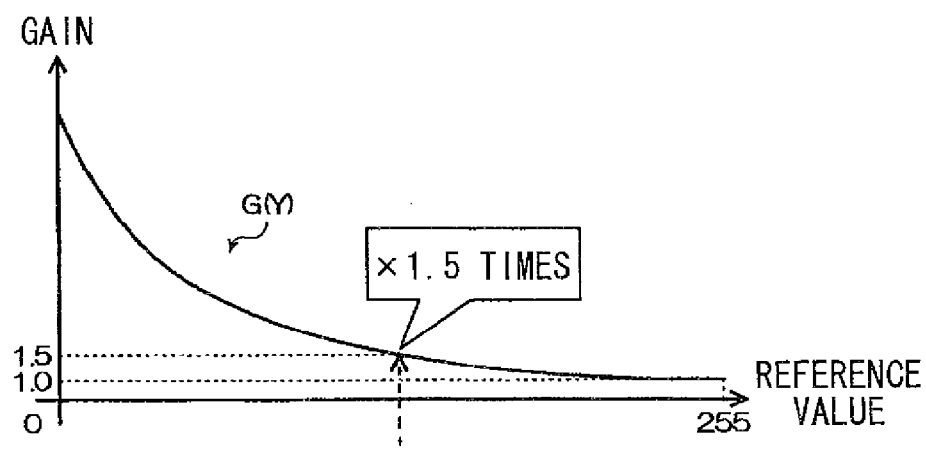
Figure 16C:
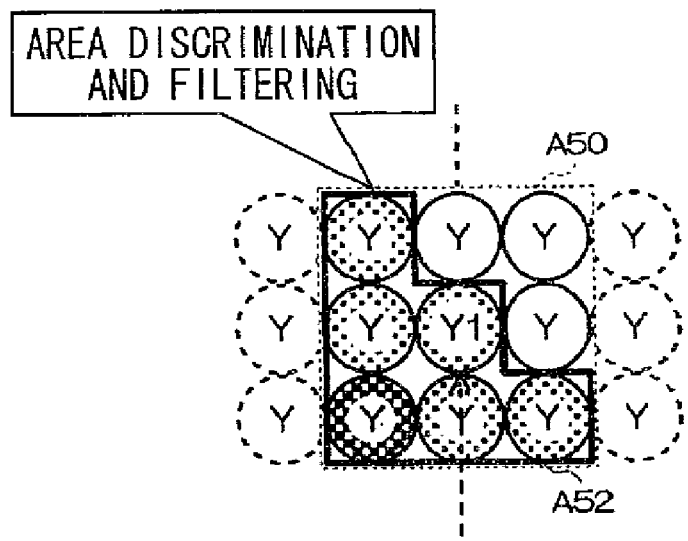
Figure 16D:
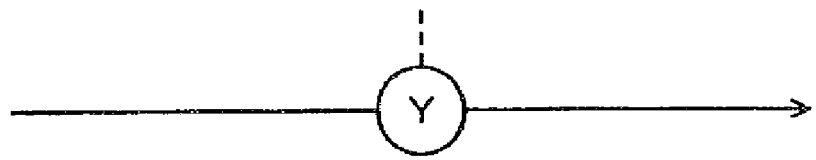
Figure 16E:
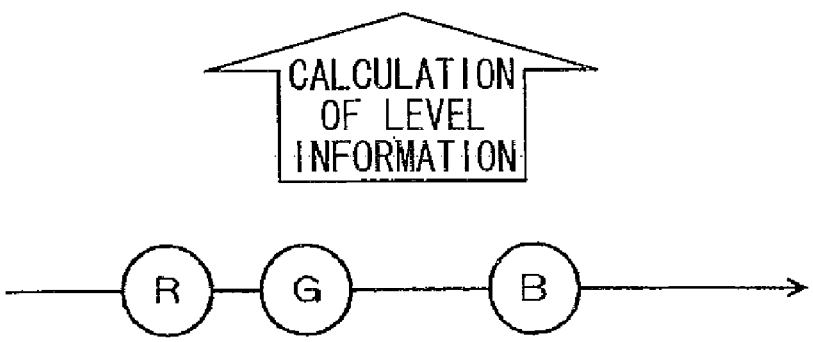

The level information calculating circuit 52 calculates level information (for example, luminance) from R, G and B image signals for each pixel input from an image file (for example, RAW data) or an image pickup portion. When the image processing apparatus 50 calculates a gain by which a target pixel (level=Y1) is multiplied, as illustrated in FIG. 16C, the image processing apparatus 50 holds level information of pixels included in an area A50 peripheral to the target pixel (for example, an area of 3 pixels×3 pixels around the target pixel or, for example, an area corresponding to the kernel size of the image processing apparatus 40).

The area separation circuit 54 discriminates between an area including the target pixel Y1 and an area including pixels the level information of which is close to that of the target pixel Y1 in the area A50 (or, an area discrimination). Specifically, the area separation circuit 54 areally separates the target pixel Y1 and pixels whose absolute value of the difference in level information from the target pixel Y1 is less than a threshold (for example, if a level is 8 bits, i.e., 0 to 255, a threshold is nearly equal to 30) out of the pixels in the area A50. This areally separates the area A52 including the pixels the level information of which is close to that of the target pixel Y1, as illustrated in FIG. 16C.

The filter circuit 56 filters the level information of the pixels in the area A52 (for example, through a smoothed filter) to calculate the reference value Y1'.

The gain calculating circuit 58 refers to a gain table G(Y) based on the reference value Y1' and calculates a gain (for example, 1.5) by which the R, G and B signals of each pixel are multiplied. The multiplying circuits 60R, 60G and 60B multiply the R, G and B signals by the gain. The gain table G(Y) is one for representing a relationship between the reference value and the gain and is stored in a memory (not shown) of the image processing apparatus 50. For example, the gain is set so as to be minimized (=1.0) at the maximum of the reference value and increased as the reference value is decreased, as illustrated in FIG. 16B.

Figure 17B:
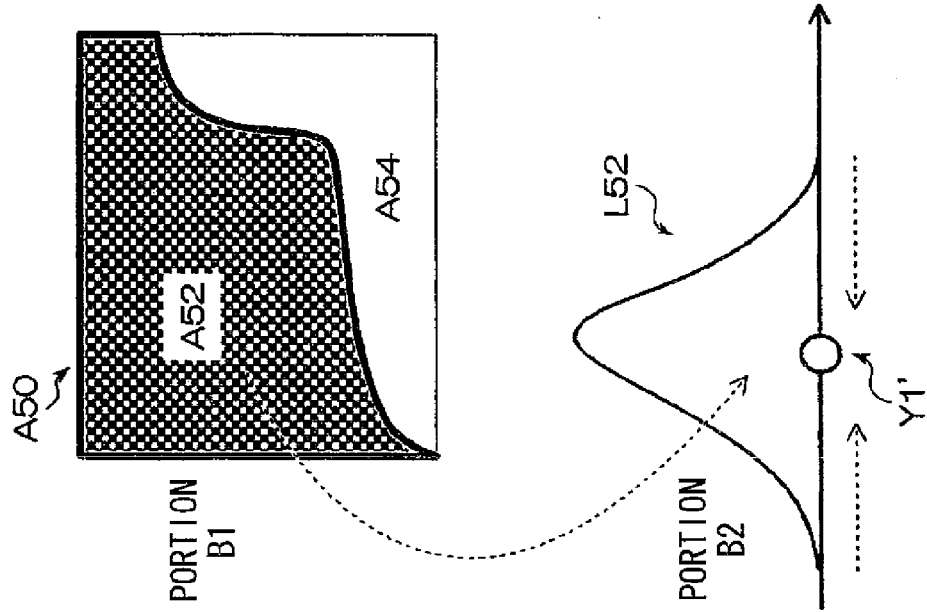
FIGS. 17A and 17B are diagrams describing the calculation process of the reference value Y1' according to the fifth embodiment.
Figure 17A:
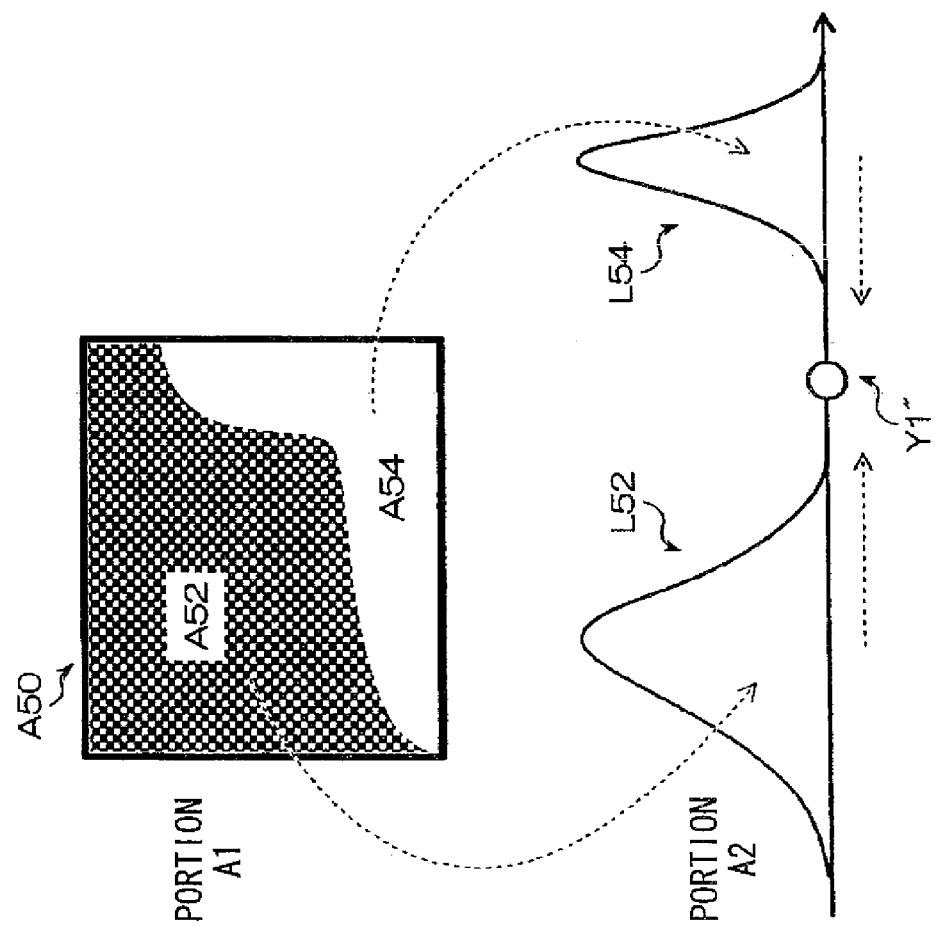

FIGS. 17A and 17B are diagrams describing the calculation process of the reference value Y1'. In the portion A1 of FIG. 17A and the portion B1 of FIG. 17B, the abscissa represents the level information of each pixel and the ordinate expresses the number of pixels.

In the example illustrated in the portion A1 of FIG. 17A, the area A50 peripheral to the target pixel Y1 is clearly divided into a low level area A52 where the level information is low (for example, a low luminance area) and a high level area A54 where the level information is high (for example, a high luminance area). In this case, as illustrated in the portion A2 of FIG. 17A, two peaks L52 and L54 are produced correspondingly to the low level area A52 and the high level area A54 respectively in the histogram of level information of the pixels in the area A50. For this reason, the reference value Y1" obtained by filtering the area A50 lies between the two peaks L52 and L54 to be an appropriate value that is apart from the level information of the peripheral pixels.

In the present embodiment, as illustrated in the portion B1 of FIG. 17B, the area A52 where level information is close to that of the target pixel Y1 is separated. As illustrated in the portion B2 of FIG. 17B, a preferable reference value Y1' is obtained in which the level of the target pixel Y1 is rendered close to the medium value of a distribution function L52 to which the target pixel Y1 belongs.

Figure 18:
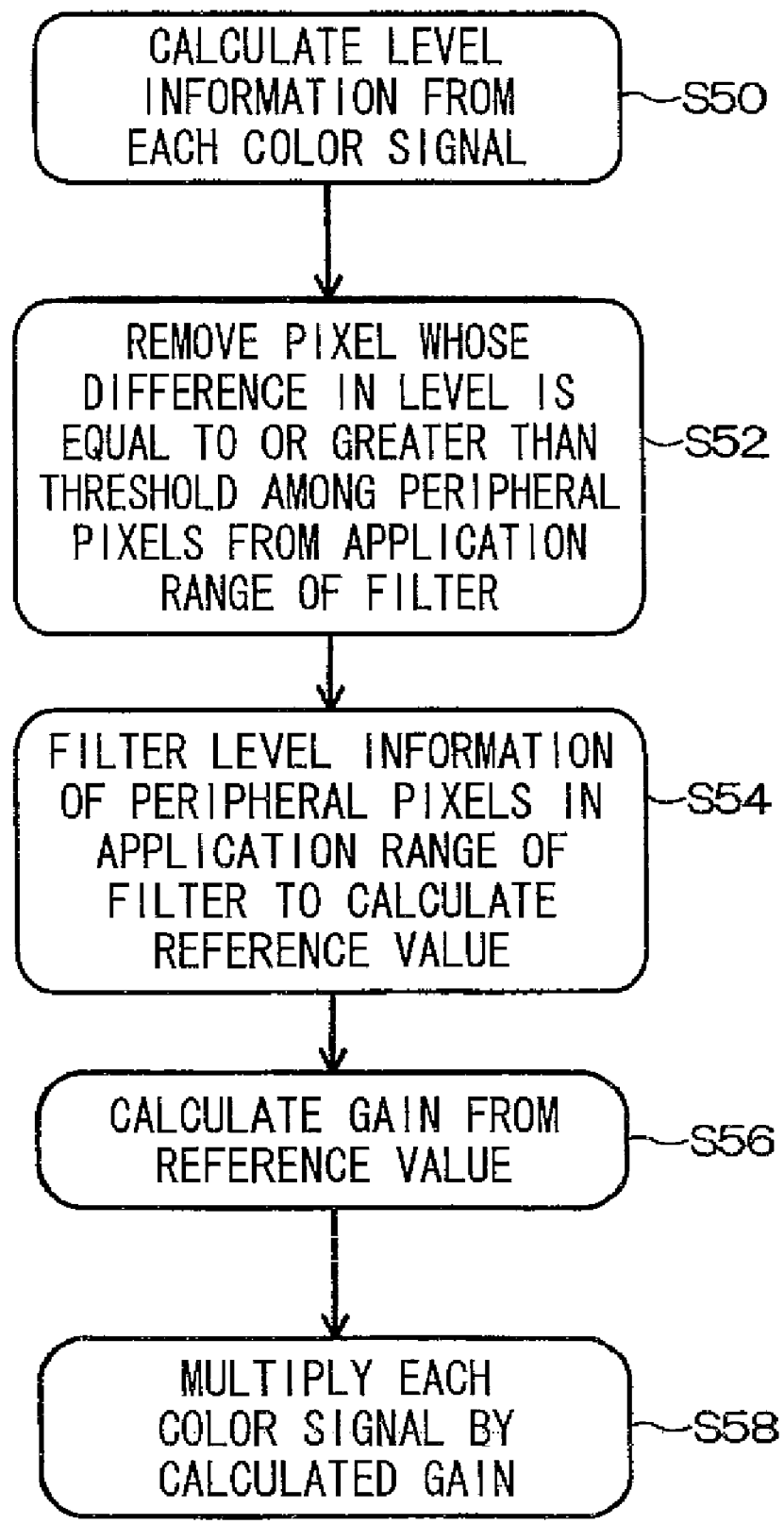
FIG. 18 is a flow chart illustrating the flow of the dynamic range compression process according to the fifth embodiment.

FIG. 18 is a flow chart illustrating the flow of the dynamic range compression process according to the present embodiment. When the R, G and B color signals are input, the level information calculating circuit 52 calculates the level information of each pixel (step S50). Then, among the pixels peripheral to the target pixel Y1, a pixel whose difference in level from the target pixel Y1 is equal to or greater than a threshold is removed from the application range of a filter (step S52). The target pixel Y1 and the peripheral pixels the level information of which is close to that of the target pixel Y1 are filtered to calculate the reference value Y1' (step S54). The gain calculating circuit 58 calculates a gain by which each color signal of the target pixel Y1 is multiplied from the reference value Y1' (step S56) and each color signal is multiplied by the gain (step S58).

According to the present embodiment, the gain is calculated based on the reference value Y1' obtained by filtering the target pixel Y1 and peripheral pixels the level information of which is close to that of the target pixel Y1 to enable a comfortable dynamic range compression even in a boundary portion where level information is high and low.

As is the case with the first embodiment, the image processing apparatus 50 according to the present embodiment may further include a gradation conversion circuit at the rear stage thereof (at the output thereof) and may be mounted on an image pickup apparatus.

Sixth Embodiment

Figure 19A:
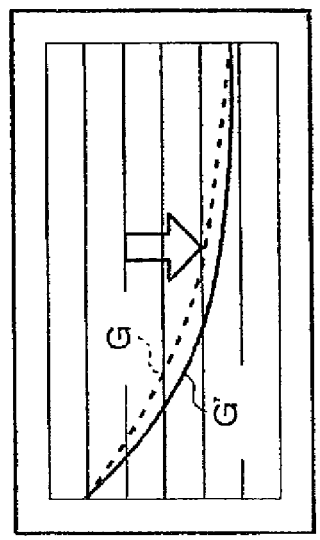
FIGS. 19A, 19B and 19C are graphs describing gain, a gradation conversion curve and a final conversion curve.
Figure 19B:
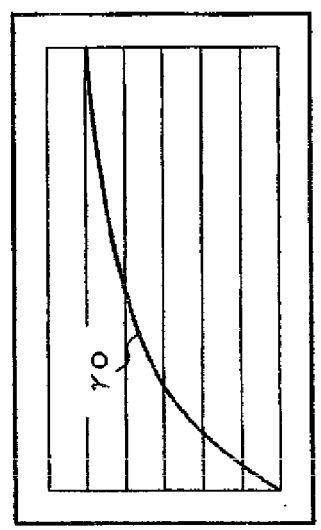
Figure 19C:
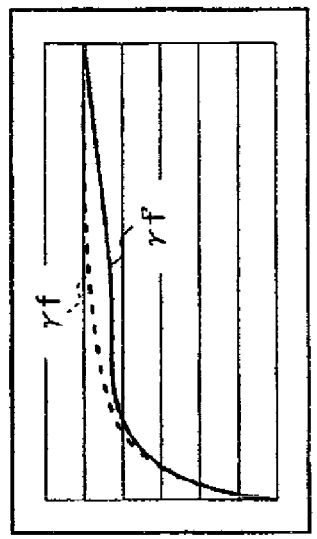

The sixth embodiment of the present invention is described below. FIGS. 19A, 19B and 19C are graphs describing gain, a gradation conversion curve and a final conversion curve. In the first to the fifth embodiment, the level information is multiplied by the gain G to perform the dynamic range compression and then a normal gradation conversion curve γo (or, a gamma curve, hereinafter referred to as "normal gradation") is used to perform the gradation conversion processing. In the following description, the product of the gain G and the normal gradation conversion curve γo is referred to as "final gradation conversion curve γf" (hereinafter referred to as "final gradation"). As illustrated in FIG. 19A, if the gain G is decreased, the decreased gain G' and the final gradation γf' obtained from the normal gradation γo are distorted to make unnatural the gradation of an image subjected to the gradation conversion. In the present embodiment, an undistorted final gradation γf is preset to inversely calculate the gain G from the final gradation γf, thereby the distortion of the final gradation γf is eliminated to allow a natural image to be produced.

FIG. 20 is a block diagram illustrating the main configuration of an image processing apparatus according to the sixth embodiment of the present invention. As illustrated in FIG. 20, the image processing apparatus 70 according to the embodiment includes a level information calculating circuit 72, a final gradation conversion circuit 74, a gain calculating circuit 76 and multiplying circuits 78 (78R, 78G and 78B).

The level information calculating circuit 72 calculates level information (for example, luminance) from R, G and B image signals for each pixel input from an image file (for example, RAW data) or an image pickup portion.

The final gradation conversion circuit 74 holds the final gradation γf by which the level information A input from the level information calculating circuit 72 is multiplied. The final gradation conversion circuit 74 holds a plurality of the final gradations γf according to shooting scenes, selects an appropriate final gradation γf adapted to shooting scenes (for example, contents to be set in shooting) and multiplies the level information A by the final gradation γf.

A gain inverse-calculation circuit 76 calculates a gain G from an output C obtained by multiplying the level information A by the final gradation γf, the normal gradation γo and the final gradation γf.

Figure 21:
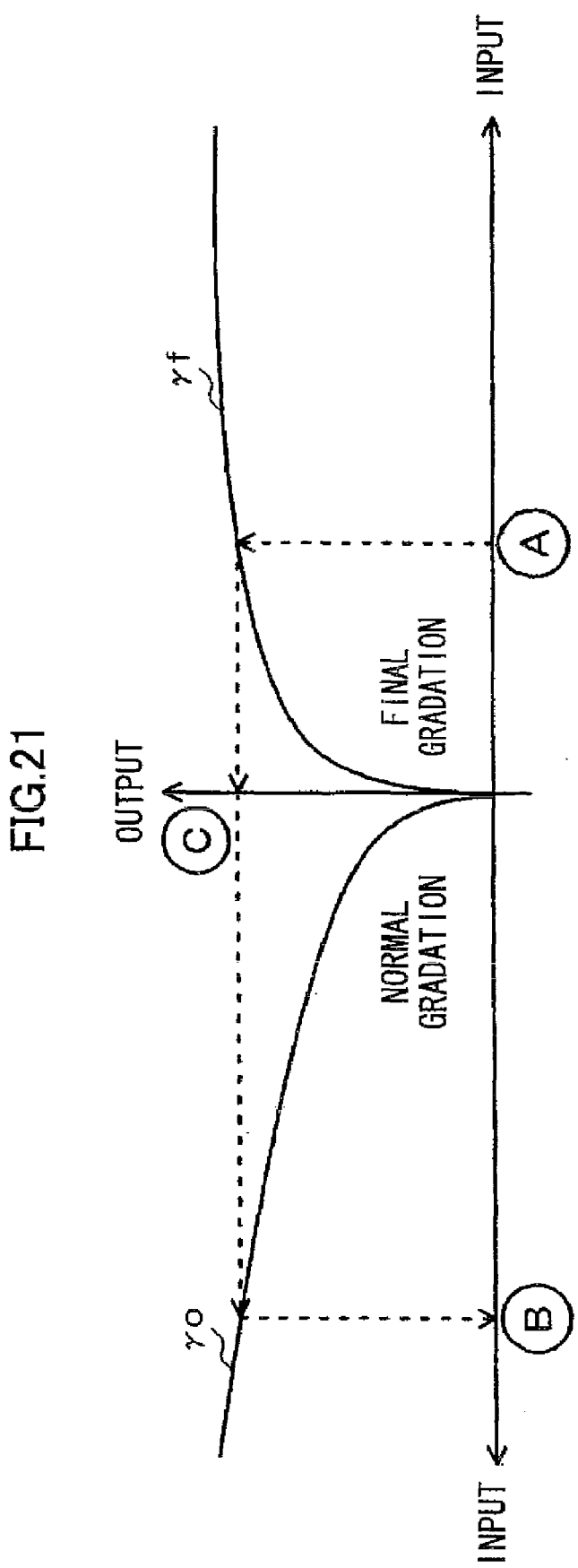
FIG. 21 is a flow chart describing the flow of the dynamic range compression process according to the sixth embodiment.

FIG. 21 is a diagram describing a gain inverse-calculation process. To obtain the gain G by inverse calculation, as illustrated in FIG. 21, firstly, the level information A input from the level information calculating circuit 72 is multiplied by the final gradation γf to calculate the output C. Secondly, a gradation conversion circuit 80 inversely calculates such an input B that an output is equal to the output C when the level information A is multiplied by the normal gradation γo. This calculates the gain G=B/A.

The multiplying circuits 78R, 78G and 78B multiply the R, G and B signals by the gain G (=B/A).

Figure 22:
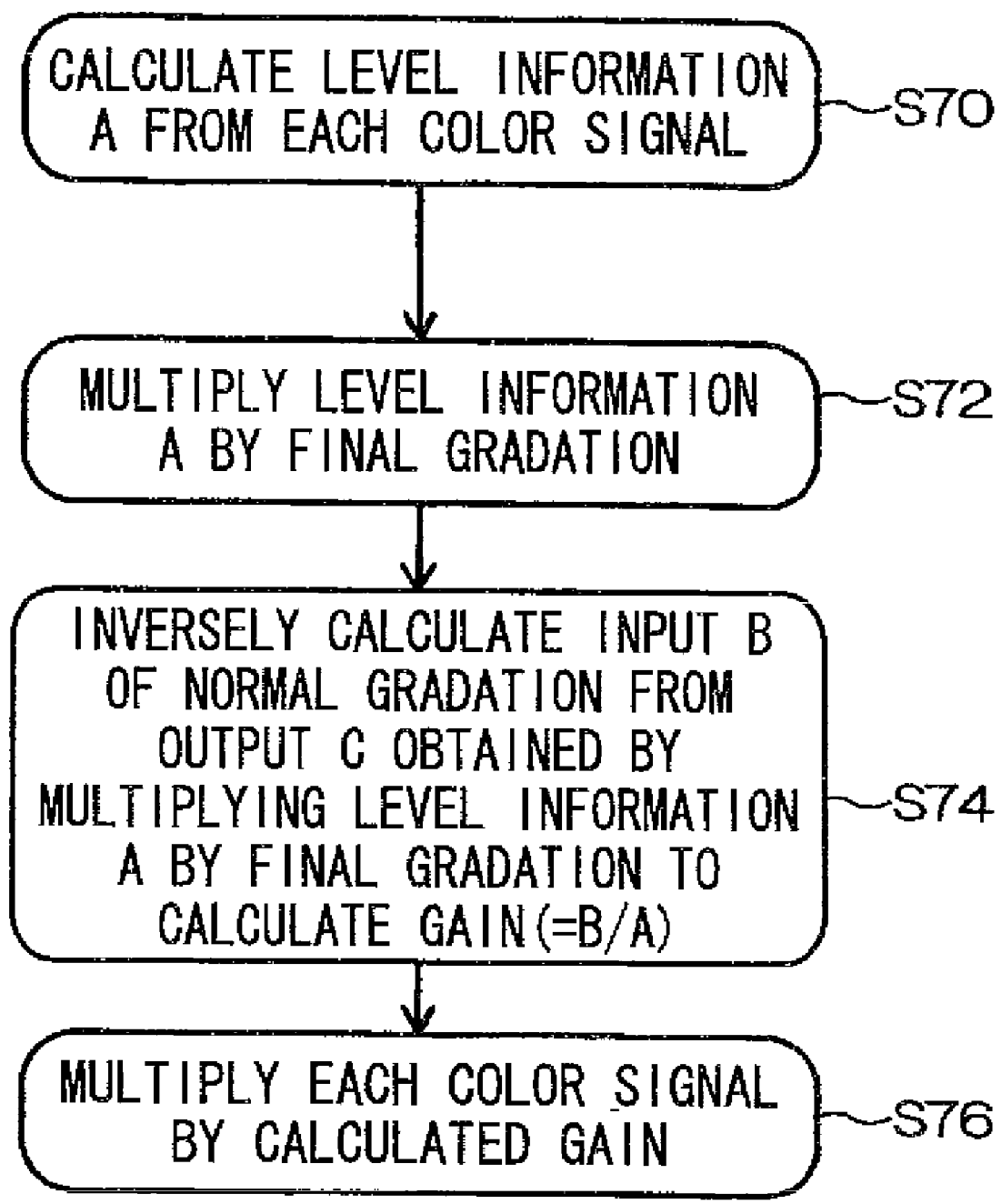
FIG. 22 is a diagram describing the inverse calculation process of gain.

FIG. 22 is a flow chart illustrating the flow of the dynamic range compression process according to the present embodiment. When the R, G and B color signals are input, the level information calculating circuit 72 calculates a level information A (step S70) and the level information A is multiplied by the final gradation γf according to shooting scenes (step S72).

Then, the input B of the normal gradation is inversely calculated from the output C obtained by multiplying the level information A by the final gradation γf to calculate the gain G (=B/A) (step S74) and each color signal is multiplied by the gain G (step S76).

According to the present embodiment, the distortion of the final gradation obtained from the gain G and the normal gradation conversion curve can be eliminated, providing a more natural image output.

As is the case with the first embodiment, the image processing apparatus 70 according to the present embodiment may be mounted on an image pickup apparatus.

The image processing apparatus according to the above embodiments can be realized by an image processing apparatus (for example, a personal computer (PC) and a video reproducing apparatus) which applies the dynamic range compression process to an input image file (for example, RAW data) and by an image processing program used in the above image processing apparatus.

What is claimed is:

1. An image processing apparatus comprising:
   an image signal inputting device which inputs color signals for each pixel;
   a level information calculating device which calculates the level information of each pixel by performing a weighted addition to the color signals by highly weighting a color signal the level of which is high among the color signals, by moderately weighting a color signal the level of which is moderate among the color signals, and by lowly weighting a color signal the level of which is low among the color signals;
   a gain calculating device which calculates a gain by which the color signals of each pixel are multiplied based on the level information; and
   a multiplying device which multiplies the color signals of each pixel by the gain.

2. The image processing apparatus according to claim 1, further comprising
   a gradation conversion device which applies a gradation conversion processing to the color signals of each pixel, the color signals having been multiplied by the gain by the multiplying device and output.

3. The image processing apparatus according to claim 1, wherein
   the gain calculating device refers to a gain table representing a relationship between the level information and the gain, based on the calculated level information of each pixel, to calculate the gain.

4. The image processing apparatus according to claim 1, wherein
   the gain is set so as to be increased as a weighted additional value of color signals is decreased.

5. An image pickup apparatus comprising:
   an image pickup device which includes image sensors from which image signals for each pixel are read; and
   the image processing apparatus according to claim 1 which processes the image signals outputted from the image pickup device.

6. An image processing method comprising:
   an image signal inputting step of inputting color signals for each pixel;
   a level information calculating step of calculating the level information of each pixel by performing a weighted addition to the color signals by highly weighting a color signal the level of which is high among the color signals, by moderately weighting a color signal the level of which is moderate among the color signals, and by lowly weighting a color signal the level of which is low among the color signals;
   a gain calculating step of calculating a gain by which the color signals of each pixel are multiplied based on the level information; and
   a multiplying step of multiplying the color signals of each pixel by the gain.

7. The image processing method according to claim 6, further comprising
   a gradation conversion step of applying a gradation conversion processing to the color signals of each pixel, the color signals having been multiplied by the gain at the multiplying step and output.

8. The image processing method according to claim 6, wherein
   at the gain calculating step, a gain table representing a relationship between the level information and the gain is referred based on the calculated level information of each pixel, to calculate the gain.

9. The image processing method according to claim 6, wherein
   the gain is set so as to be increased as a weighted additional value of color signals is decreased.

* * * * *